(12) United States Patent
Hong et al.

(10) Patent No.: US 8,040,911 B2
(45) Date of Patent: Oct. 18, 2011

(54) METHOD AND APPARATUS FOR ALLOCATING UPSTREAM CHANNEL RESOURCE IN HYBRID FIBER COAXIAL NETWORK

(75) Inventors: Seung Eun Hong, Daejeon (KR); Ho Jin Kwon, Seoul (KR); O Hyung Kwon, Daejeon (KR); Soo In Lee, Daejeon (KR)

(73) Assignee: Electronics and Telecommunications Research Institute, Daejeon-city (KR)

( * ) Notice: Subject to any disclaimer, the term of this patent is extended or adjusted under 35 U.S.C. 154(b) by 161 days.

(21) Appl. No.: 12/198,990

(22) Filed: Aug. 27, 2008

(65) Prior Publication Data

US 2009/0103557 A1 Apr. 23, 2009

(30) Foreign Application Priority Data

Oct. 19, 2007 (KR) .................. 10-2007-0105755

(51) Int. Cl.
*H04L 12/28* (2006.01)
(52) U.S. Cl. ..................................... 370/431
(58) Field of Classification Search .......... 370/229–235, 370/236, 255, 351–372, 389–394, 395.1, 370/395.4, 395.41, 395.43, 395.5, 400, 422, 370/431–443, 458, 465, 485, 503, 529
See application file for complete search history.

(56) References Cited

U.S. PATENT DOCUMENTS

| | | | | |
|---|---|---|---|---|
| 6,791,995 | B1* | 9/2004 | Azenkot et al. | 370/436 |
| 6,898,755 | B1* | 5/2005 | Hou | 714/784 |
| 7,089,580 | B1* | 8/2006 | Vogel et al. | 725/111 |
| 7,164,697 | B1* | 1/2007 | Beser | 370/485 |
| 7,315,967 | B2* | 1/2008 | Azenko et al. | 714/704 |
| 7,496,110 | B1* | 2/2009 | Beser | 370/458 |
| 7,529,272 | B1* | 5/2009 | Beser | 370/485 |
| 2001/0055319 | A1* | 12/2001 | Quigley et al. | 370/480 |
| 2002/0036985 | A1* | 3/2002 | Jonas et al. | 370/235 |
| 2002/0101883 | A1* | 8/2002 | Ruszczyk et al. | 370/503 |
| 2003/0142690 | A1* | 7/2003 | Beser | 370/432 |
| 2003/0177502 | A1* | 9/2003 | Kolze et al. | 725/111 |
| 2004/0146038 | A1* | 7/2004 | Dale et al. | 370/348 |
| 2005/0039103 | A1* | 2/2005 | Azenko et al. | 714/776 |
| 2005/0122996 | A1* | 6/2005 | Azenkot et al. | 370/477 |
| 2007/0195817 | A1* | 8/2007 | Denney et al. | 370/468 |
| 2007/0223513 | A1* | 9/2007 | Pantelias et al. | 370/442 |
| 2007/0280291 | A1* | 12/2007 | Beser | 370/468 |
| 2008/0170853 | A1* | 7/2008 | Rakib et al. | 398/26 |
| 2009/0125959 | A1* | 5/2009 | Oh et al. | 725/111 |

\* cited by examiner

*Primary Examiner* — Kwang B Yao
*Assistant Examiner* — Jung-Jen Liu
(74) *Attorney, Agent, or Firm* — Ladas & Parry LLP

(57) ABSTRACT

A method and apparatus for allocating upstream channel resources in a hybrid fiber coaxial (HFC) network are provided. A cable modem termination system (CMTS) previously provides cable modems (CMs) with a plurality of burst profiles through an extended interval usage code (IUC) of an upstream channel descriptor (UCD) message, and allocates resources to CMs by using an optimized burst profile according to an upstream channel status, thereby increasing transmission efficiency of an upstream channel.

22 Claims, 16 Drawing Sheets

METHOD AND APPARATUS FOR ALLOCATING UPSTREAM CHANNEL RESOURCE IN HYBRID FIBER COAXIAL NETWORK

CROSS-REFERENCE TO RELATED PATENT APPLICATION

This application claims the benefit of Korean Patent Application No. 10-2007-0105755, filed on Oct. 19, 2007, in the Korean Intellectual Property Office, the disclosure of which is incorporated herein in its entirety by reference.

BACKGROUND OF THE INVENTION

1. Field of the Invention

The present invention relates to a cable modem termination system (CMTS) and a cable modem (CM) system in a hybrid fiber coaxial (HFC) network, and more particularly to, a method and apparatus for providing a CM with a plurality of burst profiles for an upstream data transmission via an upstream channel descriptor (UCD) received from a CMTS, and for allocating resources to the CM by using the plurality of burst profiles according to a data reception status through an upstream channel check.

The present invention is derived from a research project supported by the Information Technology (IT) Research & Development (R&D) program of the Ministry of Information and Communication (MIC) of Korea [2006-S-019-02, Development of Digital Cable Transmission and Reception System for 1 Gbps Downstream].

2. Description of the Related Art

FIG. 1 illustrates a conventional hybrid fiber coaxial (HFC) network 150 comprising a cable modem termination system (CMTS) 110 and a plurality of cable modems (CMs) 120. Conventional medium 140 constituting the HFC network 150 includes coaxial cable and fiber optic cable.

Referring to FIG. 1, the CMTS 110 transmits or receives a signal to or from the CMs 120 over the HFC network 150. Therefore, each user 130 transmits and receives data over the CMs 120. In more detail, the data is transferred via channels within HFC and coaxial cable, in which one of a plurality of channels is used to transfer a downstream signal from the CMTS 110 to the CMs 120, and another is used to transfer an upstream signal from the CMs 120 to the CMTS 110.

The downstream channel used to transfer a downstream signal from the CMTS 110 to the CMs 120 constitutes a bandwidth of 6/8 MHz within a frequency range of 54~860/100~860 in North America/Europe, and uses a modulation technique of 64 quadrature amplitude modulation (QAM) using a 6 bit symbol or 256 QAM using an 8 bit symbol.

The upstream channel used to transfer an upstream signal from the CMs 120 to the CMTS 110 constitutes a bandwidth of 0.2/0.4/0.8/1.6/3.2/6.4 MHz within a frequency range of 5~42 MHz, and uses a modulation technique of quadrature phase shift keying (QPSK) using a 2 bit symbol, 8 QAM using a 3 bit symbol, 16 QAM using a 4 bit symbol, 32 QAM using a 5 bit symbol or 64 QAM using a 6 bit symbol. In particular, unlike the downstream channel used to transfer the downstream signal from the CMTS 110 to the CMs 120, since the upstream channel transmits a burst signal that is transferred over the same center frequency and bandwidth from the CMs 120 to the CMTS 110, each CM 120 needs to transmit the burst signal within one of a competition slot, a reserved slot, and a minute adjustment slot.

On the grounds stated above, the data over cable service Interface specification (DOCSIS) standard uses a request-permission method in order for the CMs 120 to obtain an opportunity to transmit data over the upstream channel and uses another request-permission method according to DOCSIS 1.x/2.0, DOCSIS 3.0, etc. Therefore, the CMs 120 request the CMTS 110 to allocate bandwidths if a packet arrives at an upstream transmission queue. The bandwidth allocation request is made by an independent request message, or is piggybacked during a data transmission, and is transferred to the CMTS 110.

FIG. 2A illustrates a conventional format of a request message 201 used by a CM of a DOCSIS 1.x/2.0 version to request a CMTS to allocate a bandwidth.

Referring to FIG. 2A, the conventional request message 201 includes 1 frame control (FC) information byte 210 indicating a type of a frame, 2 service ID (SID) information bytes 230, and 1 mini-slot number information byte 220 necessary for packet transmission.

FIG. 2B illustrates a conventional format of a queue-depth based request message 202 used by a CM of a DOCSIS 3.0 version to request a CMTS to allocate a bandwidth. Referring to FIG. 2B, the queue-depth based request message 202 includes 1 FC information byte 250, indicating a type of a frame, 2 SID information bytes 270, and 2 length information bytes 260 of a packet stored in an upstream transmission queue.

In particular, the CM of the DOCSIS 1.x/2.0 version requests an allocation of bandwidths using the number of mini-slots necessary for transmitting a packet when requesting the allocation of bandwidths. In this regard, the number of mini-slots includes a physical layer overhead necessary for transmitting the packet. The size of one mini-slot is determined as $2^n$ times 6.25 µs (n=0, 1, ..., m), and is defined in an upstream channel descriptor (UCD) message regarding each upstream channel. Thus, the CM needs to calculate the size of one mini-slot necessary for a packet transmission including the physical layer overhead in order to request the allocation of bandwidths.

However, the CM of the DOCSIS 3.0 version requests byte lengths of packets stored in the upstream transmission queue in order to transmit packets when requesting the allocation of bandwidths. The CMTS needs to calculate and allocate byte lengths stored in a queue requested by the CM and the number of mini-slots necessary for transmitting lengths of the physical layer overhead and a segment length necessary for the packet transmission.

FIG. 3 is a flowchart illustrating a method of determining the size of a bandwidth necessary for a packet transmission and requesting an allocation of bandwidths in a CM according to a DOCSIS standard. Referring to FIG. 3, it is examined whether a CM version is 1.x/2.0/3.0 (operations 302 and 303). If the CM version is 3.0, the requested bandwidth size is determined as the length of a packet stored in a queue (operation 310), and a resource-request message is transmitted (operation 350).

If the CM version is 2.0, advanced short data burst parameters are used to calculate the size of a necessary mini-slot (operation 330), and the calculated result value is compared with a maximum burst size (MBS) value from among the advanced short data burst parameters (operation 331). If the MBS value is greater than the calculated result value, the calculated result value is determined as the requested bandwidth size and the resource-request message is transmitted (operation 350). If the calculated result value is greater than the MBS value, advanced long data burst parameters are used to calculate the size of the necessary mini-slot (operation 332), and the calculated result value is compared with the MBS value among the advanced short data burst parameters (operation 333). If the calculated result value is greater than the MBS value, the calculated result value is determined as the requested bandwidth size and the resource-request message is transmitted (operation 350). If the MBS value is greater than the calculated result value, the requested bandwidth size is determined to be greater than the MBS value by 1 (operation 340), and the resource-request message is transmitted (operation 350).

If the CM version is 1.x, short data burst parameters are used to calculate the size of the necessary mini-slot (operation 320), and the calculated result value is compared with an MBS value among the short data burst parameters (operation 321). If the MBS value is greater than the calculated result value, the calculated result value is determined as the requested bandwidth size and the resource-request message is transmitted (operation 304). If the calculated result value is greater than the MBS value, long data burst parameters are used to calculate the size of the necessary mini-slot (operation 322), and the calculated result value is compared with the MBS value from among the short data burst parameters (operation 323). If the calculated result value is greater than the MBS value, the calculated result value is determined as the requested bandwidth size and the resource-request message is transmitted (operation 350). If the MBS value is greater than the calculated result value, the requested bandwidth size is determined to be greater than the MBS value by 1 (operation 340), and the resource-request message is transmitted (operation 350).

The CMTS requested by the CMs for the allocation of bandwidths transmits a mobile application part (MAP) message including information on the allocation of bandwidths to a downstream channel, and notifies each CM of information on a transmittable mini-slot that is necessary for data transmission.

FIG. 4 illustrates a format of a MAP message 400 that a CMTS transfers to CMs. Referring to FIG. 4, the MAP message 400 includes a media access control (MAC) management message header 410 indicating information on a destination MAC address, a source MAC address, and the MAC management message type/version, an upstream channel ID 1 byte 421 indicating information on an upstream channel used to allocate bandwidths by the MAP message 400, a UCD change counter 1 byte 422 indicating a UCD message to be used to transmit packets, the number of information elements (IEs) (1 byte) 423 indicating the number of IEs included in the MAP message, 1 reserved filed byte 424 that is not used, 4 allocation start time bytes 425 indicating an initial time for allocating bandwidths by the MAP message 400, 4 response time bytes 426 indicating a time for receiving a last resource-request message used to allocate bandwidths by the MAP message 400, transmission backoff start and end 427, and one or more IEs 430 that is information on the substantial allocation of bandwidths.

In particular, the IEs 430 include a 14 bit SID 431 indicating a type of a service to which a bandwidth is allocated, a 4 bit interval usage code (IUC) indicating information on a physical layer parameter used to transmit packets, and a 14 bit offset value 433 indicating information on a time for allocating bandwidths.

CMs receive the MAP message 400 from the CMTS, obtain information on mini-slot information allocated as an offset value in an IE regarding the same SID as an SID included in the resource-request message, and transmit packets using physical layer parameters defined in burst profiles indicated by an IUC.

CMs that receive the MAP message 400 must previously know the physical layer parameter in order to transmit packets by using the allocated bandwidths. In particular, a CM of the DOCSIS 1.x/2.0 version needs to calculate the size of requested bandwidths by using the physical layer parameter defined according to the burst characteristics in order to transmit the resource-request message. The DOCSIS standard defines fixed IUC values respectively corresponding to burst profiles in which the physical layer parameter is defined.

Table 1 includes the definition of IUC values allocated to each burst profile defined in the DOCSIS standard. Therefore, the DOCSIS standard defines 9 IUC values including Initial Maintenance, Periodic Maintenance, Request, Request/Data, Short Data, Long Data, Adv Short Data, Adv Long Data, and Adv Unsolicited Grant as shown in Table 1 below.

TABLE 1

| Interval Usage Code (IUC) | IE Name | SID |
| --- | --- | --- |
| 1 | Request | With Any SID |
| 2 | Request/Data | With Multicast SID |
| 3 | Initial Maintenance | With Broadcast or Unicast SID |
| 4 | Station Maintenance | With Unicast SID |
| 5 | Short Data Grant | With Unicast SID |
| 6 | Long Data Grant | With Unicast SID |
| 7 | Null IE | Zero |
| 8 | Data Ack | With Unicast SID |
| 9 | Advanced PHY Short Data Grant | With Unicast SID |
| 10 | Advanced PHY Long Data Grant | With Unicast SID |
| 11 | Advanced PHY Unsolicited Grant | With Unicast SID |
| 12~14 | Reserved | With Any SID |
| 15 | Expansion | With expanded IUC |

Also, each burst profile included in Table 1 is provided to CMs via a UCD message as described above. The UCD message includes all parameters regarding one logical upstream channel.

FIG. 5A illustrates a format of a UCD message that a CMTS transfers to CMs. Referring to FIG. 5, the UCD message includes a MAC management message header 510 indicating information on a destination MAC address, a source MAC address, and the MAC management message type/version, 1 upstream channel ID byte 520 indicating information on an upstream channel relating to the UCD message, 1 UCD change counter byte 530 indicating a change in a previous UCD message, 1 mini-slot size byte 540 indicating the mini-slot size of the upstream channel, 1 downstream channel ID byte 550 indicating a downstream channel used to transmit the UCD message, channel parameter type/length/value (TLV) 560 indicating parameters of the upstream channel relating to the UCD message, burst descriptor TLV 570 indicating channel physical PHY parameters. There may be a plurality of burst descriptor TLVs according to each IUC value included in Table 1.

FIG. 5B illustrates burst descriptor TLVs according to each IUC value. Referring to FIG. 5B, the burst descriptor TVL includes 1 type byte 571 indicating a burst descriptor type, 1 length byte 572 indicating the whole length of PHY parameters according to one IUC value, 1 IUC byte indicating each IUC value 573, and a PHY parameter TLV 574 according to each IUC value. PHY parameter TLVs include PHY parameter information of an upstream channel such as a modulation technique, a preamble length, an MBS, protection time length, etc.

For example, Table 2 includes PHY parameter values of 5, 6, 9, 10, and 11 that are IUC values for transmitting user data in the DOCSIS standard. The UCD message including burst descriptors shown in Table 2 is transferred to all CMs via the same upstream channel. All CMs receive the UCD message, request the CMTS for resources, receive resources, and transmit data by using PHY parameter values of IUC values defined in a MAP message.

In particular, CMs of the DOCSIS 1.x version must use IUC values of 5 and 6, and CMs of the DOCSIS 2.0 version must use IUC values of 9 and 10 when requesting resources and transmitting data. Finally, since CMs of the DOCSIS 3.0 version request the size of a stored buffer when requesting resources, it is possible to use all IUC values of 5, 6, 9, and 10. In more detail, 5 burst profiles having IUC values of 5, 6, 9, 10, and 11 can transmit user data in the given DOCSIS standard, and furthermore, CMs of the DOCSIS 1.x/2.0 version can use 2 burst profiles having IUC values of 5, 6/9, and 10, respectively.

TABLE 2

| | IUC Value (Define) PHY parameter (sub-type) | | | | |
|---|---|---|---|---|---|
| | 5 (Short) | 6 (Long) | 9 (AdvphyS) | 10 (AdvphyL) | 11 (AdvphyU) |
| Modulation Type (1) | 2 | 2 | 5 | 5 | 5 |
| Differential Encoding (2) | 2 | 2 | 2 | 2 | 2 |
| Preamble Length (3) | 168 | 192 | 64 | 64 | 64 |
| FEC Error Correction (5) | 0x8 | 0xA | 0xC | 0x10 | 0xC |
| FEC Codeword Infor. Bytes (6) | 0x4E | 0xDC | 0x4E | 0xDC | 0x4E |
| Scrambler Seed (7) | 0x152 | 0x152 | 0x152 | 0x152 | 0x152 |
| Maximum Burst Size (8) | 8 | 0 | 8 | 0 | 0 |
| Guard Time Size (9) | 8 | 8 | 8 | 8 | 8 |
| Last Code word Length (10) | 2 | 2 | 2 | 2 | 2 |
| Scrambler on/off (11) | 1 | 1 | 1 | 1 | 1 |

The DOCSIS standard above supports 5 burst profiles, and CMs of the DOCSIS 1.x/2.0 version use 2 burst profiles to transmit user data. All CMs that use the same upstream channel use the same burst profile. Therefore, each CM transmits user data using upstream PHY parameters defined in burst profiles of the UCD message according to the size of user data to be transmitted irrespective of the transmission capability and upstream channel status, which reduces channel usage efficiency.

For example, in a HFC network constituting a CM A and a CM B of the DOCSIS 2.0 version that uses the same upstream channel, if the CM A can use a maximum 64 QAM/Low RS code and the CM B can use a maximum 16 QAM/High RS code during an upstream channel transmission, both CMs need to use an 16 QAM/Low RS code to transmit upstream data. Because both CMs can receive the same UCD message to use burst profiles in the UCD message, and a CMTS enables all CMs to transmit data by constituting and transmitting the UCD message.

There is a method of increasing physical layer flexibility in a CM. During an initial process of the CM and a CMTS, the CM determines whether to operate in a dynamic burst profile mode, and the CMTS provides the CM with more burst profiles and supports the burst profiles. However, the method can provide a maximum of 8 burst profiles since IUC values of a MAP message can be 4 bits, and IUC values of 1, 2, 3, 4, 7, and 8 are reserved in the DOCSIS standard.

Furthermore, since CMs that do not operate in the dynamic burst profile mode are designed to operate according to the DOCSIS standard, CMs have a problem of allocating burst profiles irrespective of the upstream channel status. Finally, the above method does not allocates burst profiles according to the upstream channel status.

SUMMARY OF THE INVENTION

The present invention provides a method of providing a plurality of burst profiles with respect to a plurality of cable modems (CMs) that transmit data using the same upstream channel and a method of allocating burst profiles to CMs of the given data over cable service Interface specification (DOCSIS) 1.x/2.0 versions according to an upstream channel status.

The present invention also provides a method of allocating burst profiles according to an upstream channel status.

The present invention also provides a method of extending an interval usage code (IUC) so that a CMTS provides CMs with a plurality of burst profiles via an upstream channel descriptor (UCD) message, and a method of presenting the extended IUC in a mobile application part (MAP) message.

The present invention also provides a method of notifying a CMTS of whether to support an extended IUC in CMs.

According to an aspect of the present invention, there is provided a method of allocating upstream channel resources by using a cable modem termination system (CMTS) in a hybrid fiber coaxial (HFC) network, the method comprising: defining a plurality of burst profiles based on an upstream channel status; transmitting the defined plurality of burst profiles to each of a plurality of cable modems (CMs); monitoring the upstream channel status of each CM; and allocating resources to each CM by using burst profiles corresponding to the upstream channel status from among the plurality of burst profiles.

According to another aspect of the present invention, there is provided a method of receiving upstream channel resources in a CM in a HFC network, the method comprising: receiving a plurality of burst profiles defined based on an upstream channel status from a CMTS; informing the CMTS of whether the CM supports all the plurality of burst profiles; transmitting a resource request message to the CMTS; and receiving resources from the CMTS by using the plurality of burst profiles determined according to whether the CM supports all the plurality of burst profiles and defined based on the upstream channel status.

According to another aspect of the present invention, there is provided an apparatus for allocating upstream channel resources in a HFC network, the apparatus comprising: a burst profile establishing unit defining a plurality of burst profiles based on an upstream channel status, and transmitting the defined plurality of burst profiles to each of a plurality of CMs; a monitoring unit monitoring the upstream channel status of each CM; and a resource allocating unit allocating resources to each CM by using burst profiles corresponding to the upstream channel status from among the plurality of burst profiles.

According to another aspect of the present invention, there is provided a computer readable recording medium having embodied thereon a computer program for executing the methods of allocating upstream channel resources and receiving upstream channel resources.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
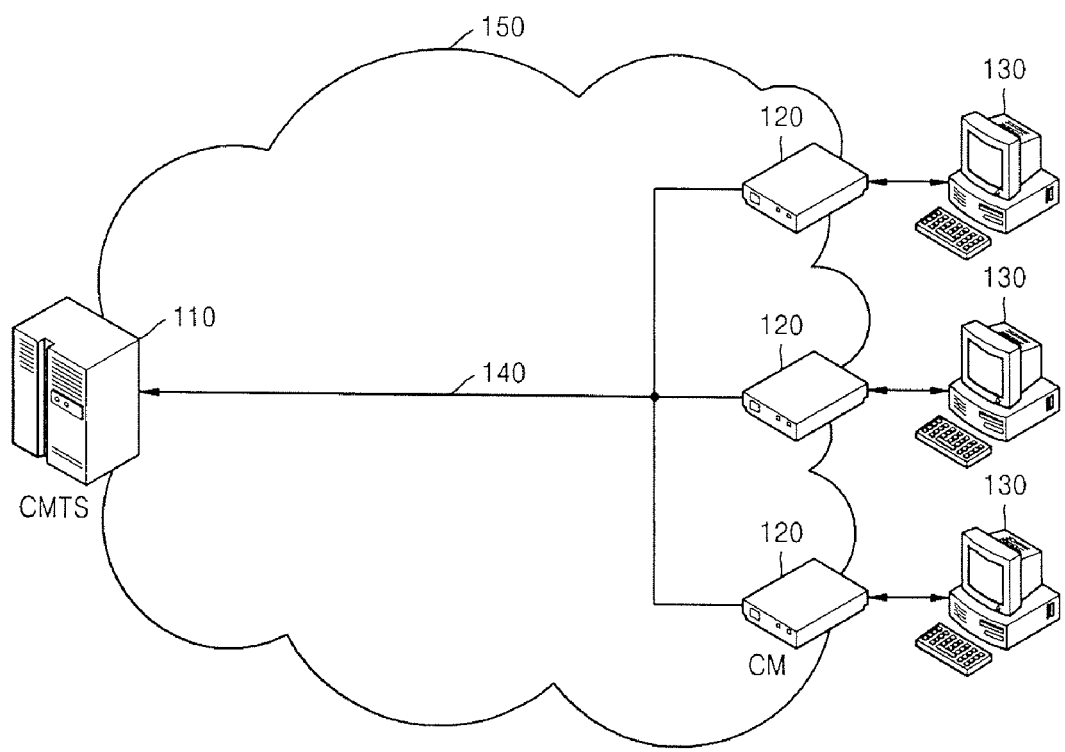
FIG. 1 illustrates a conventional hybrid fiber coaxial (HFC) network comprising a cable modem termination system (CMTS) and a plurality of cable modems (CMs)
Figure 2A:
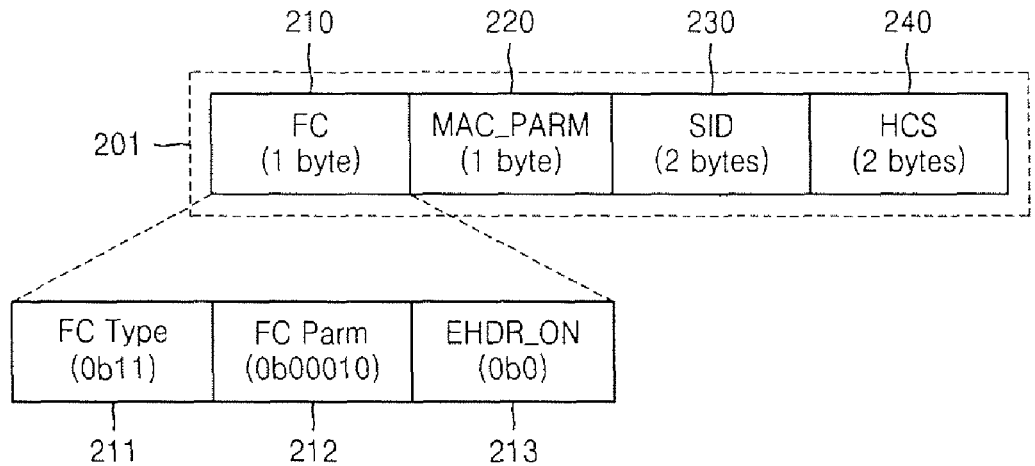
FIG. 2A illustrates a conventional format of a mini-slot based resource request message used by a cable modem (CM) of a data over cable service Interface specification (DOCSIS) 1.x/2.0 version to request a CMTS to allocate a bandwidth.
Figure 2B:
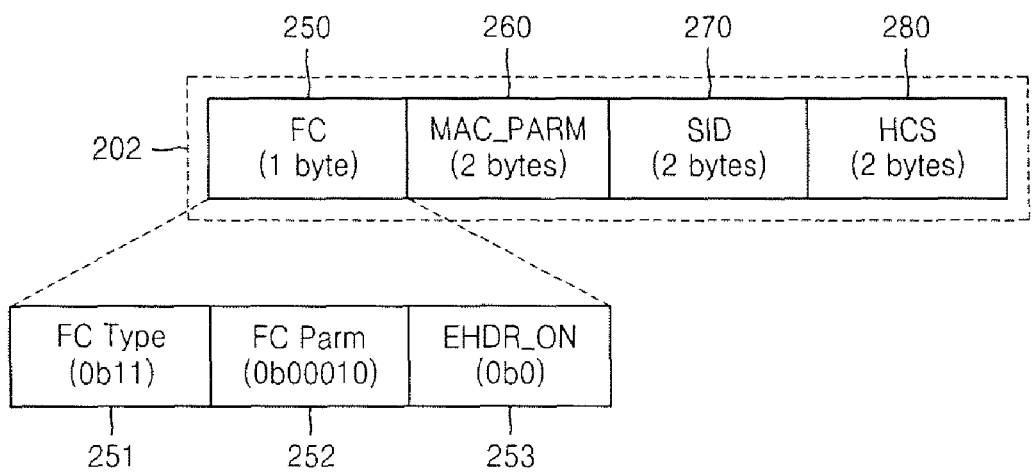
FIG. 2B illustrates a conventional format of a queue-depth based resource request message used by a CM of a DOCSIS 3.0 version to request a CMTS to allocate a bandwidth.
Figure 3:
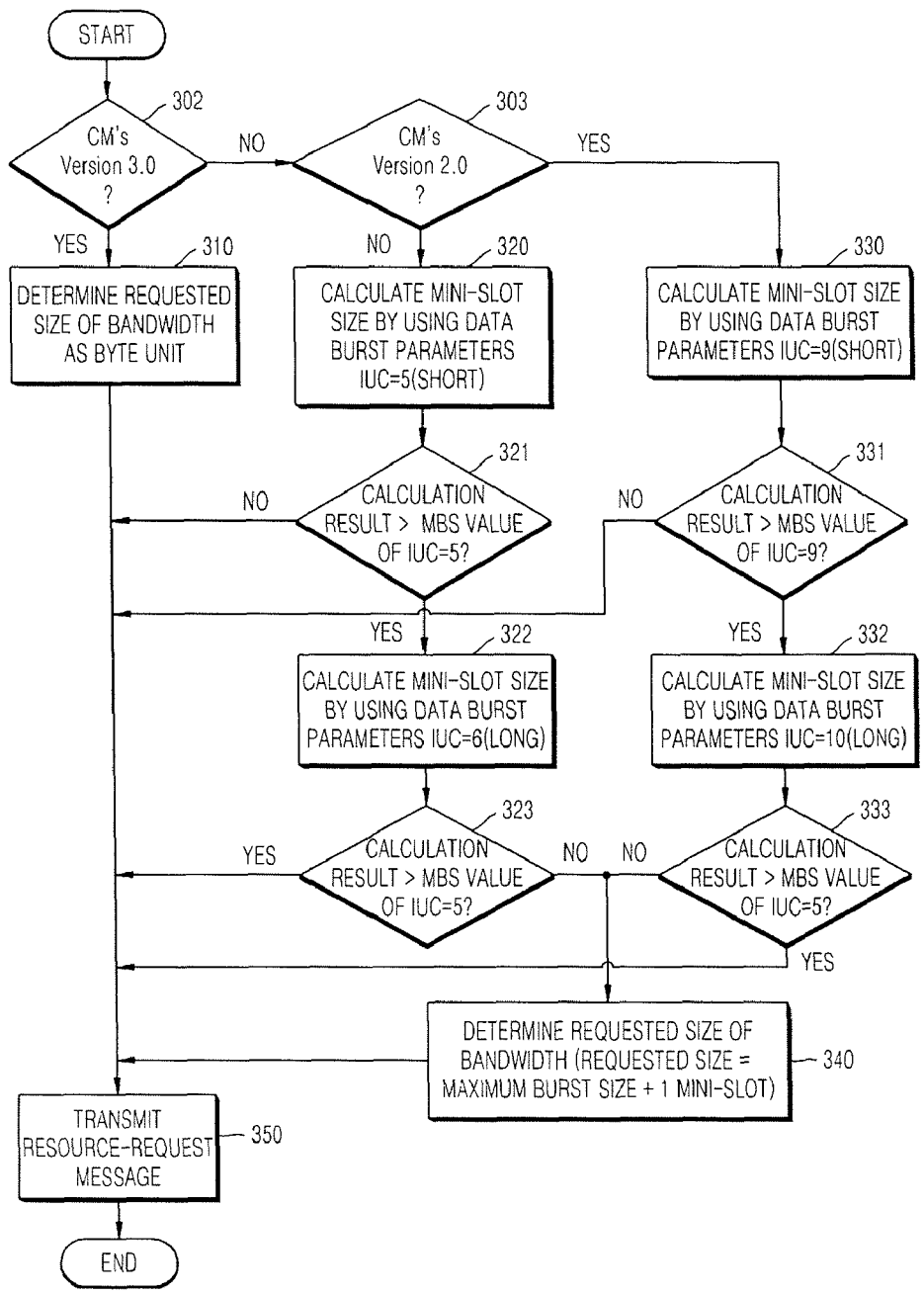
FIG. 3 is a flowchart illustrating a method of determining the size of a bandwidth necessary for a packet transmission and requesting an allocation of bandwidths in a CM according to a DOCSIS standard.

The present invention will now be described more fully with reference to the accompanying drawings, in which exemplary embodiments of the invention are shown. Although the same elements are shown in other drawings, like reference numerals in the drawings denote like elements. Hereinafter, the present invention will be described more fully with reference to the accompanying drawings, in which exemplary embodiments of the invention are shown. While describing the present invention, detailed descriptions about related well known functions or configurations that may blur the points of the present invention are omitted.

Unless otherwise defined, it will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a cable modem system, signals are transmitted upstream from a cable modem (CM) to a cable modem termination system (CMTS) when the subscriber desires to communicate with the headend. The invention is directed to a method for increasing the performance of the upstream channel from the CM to the CMTS. This is accomplished by providing a method for increasing physical layer flexibility in cable modem systems. In this manner, the CMTS is capable of assigning burst profiles and granting mini-slots to the CMs according to the CM's burst profile and robustness level.

In order for a cable modem termination system (CMTS) to allocate burst profiles to cable modems (CMs) according to an upstream channel status, the present invention provides a method of constituting burst profiles (hereinafter referred to as "extended burst profiles") to be applied with regard to a specific carrier per noise ratio (CNR) range, a method of transferring burst profiles with regard to each CNR to CMs via an upstream channel descriptor (UCD) message in the CMTS, and a method of allocating a corresponding burst profile to CMs via a mobile application part (MAP) message in the CMTS.

Furthermore, the present invention provides a method of informing the CMTS of whether extended interval usage codes (IUCs) are supported by CMs.

Meanwhile, the present invention provides a method of constituting a burst profile so that CMs can use short or advanced short burst profiles to calculate an amount of a resource-request, and using an optimized burst profile according to an upstream channel status of CMs when the CMTS allocates bandwidths.

The present invention defines extented IUC values corresponding to extended burst profiles other than IUC values corresponding to burst profiles defined in the data over cable service Interface specification (DOCSIS) standard. Therefore, the present specification uses an extended burst profile mode and extended IUC together.

Figure 6:
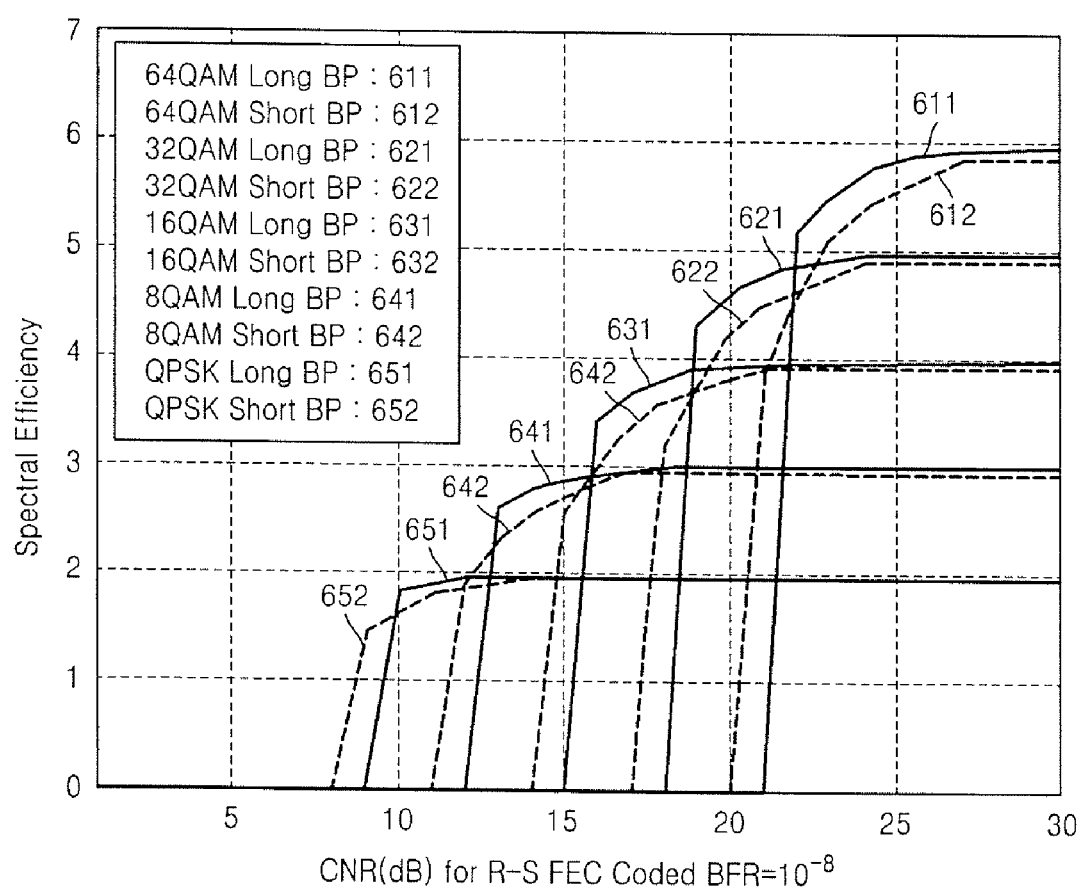
FIG. 6 is a graph illustrating frequency efficiency of short burst profiles and long burst profiles according to quadrature amplitude modulation (QAM) techniques in an additive white Gaussian noise (AWGN) environment.

FIG. 6 is a graph illustrating frequency efficiency of short burst profiles and long burst profiles according to quadrature amplitude modulation (QAM) techniques in an additive white Gaussian noise (AWGN) environment. The frequency efficiency (φ) is determined according to equation 1 below, $$\varphi = \frac{k}{n}\log_2 M \quad (1)$$

wherein, n, k, M, which are representative parameters constituting burst profiles, denote an R-S codeword byte length, an information byte length of an R-S code, and modulation degrees 64, 32, 16, 8, and 4 of QAM techniques, respectively.

R-S codes of short burst profiles use 78, k, and t and are indicated in dotted lines. R-S codes of long burst profiles use 220, k, and t and are indicated in full lines. The k is determined as a maximum value satisfying $10^{-8}$ as an upstream signal bit error rate (BER) of a corresponding burst profile.

Graphs 611 through 652 indicate the frequency efficiency (a vertical axis) with respect to carrier to noise ratio (CNR) variations according to each QAM technique. In more detail, each graph 611 through 652 indicates a simulation result of a long burst profile according to a 64 QAM technique, a simulation result of a short burst profile according to a 64 QAM technique, a simulation result of a long burst profile according to a 32 QAM technique, a simulation result of a short burst profile according to a 32 QAM technique, a simulation result of a long burst profile according to a 16 QAM technique, a simulation result of a short burst profile according to a 16 QAM technique, a simulation result of a long burst profile according to a 8 QAM technique, a simulation result of a short burst profile according to a 8 QAM technique, a simulation result of a long burst profile according to a quadrature phase shift keying (QPSK) modulation technique, and a simulation result of a short burst profile according to a QPSK modulation technique, respectively.

The simulation results of long and short burst profiles according to all modulation techniques show that long burst profiles have higher transmission efficiency than short burst profiles. In more detail, long burst profiles of the 32 QAM technique have higher transmission efficiency than short burst profiles of the 64 QAM technique. Therefore, burst profiles may be designed to change a modulation technique and R-S code according to the upstream channel status. Also, a long R-S code can have higher efficiency than a short R-S code.

Figure 7:
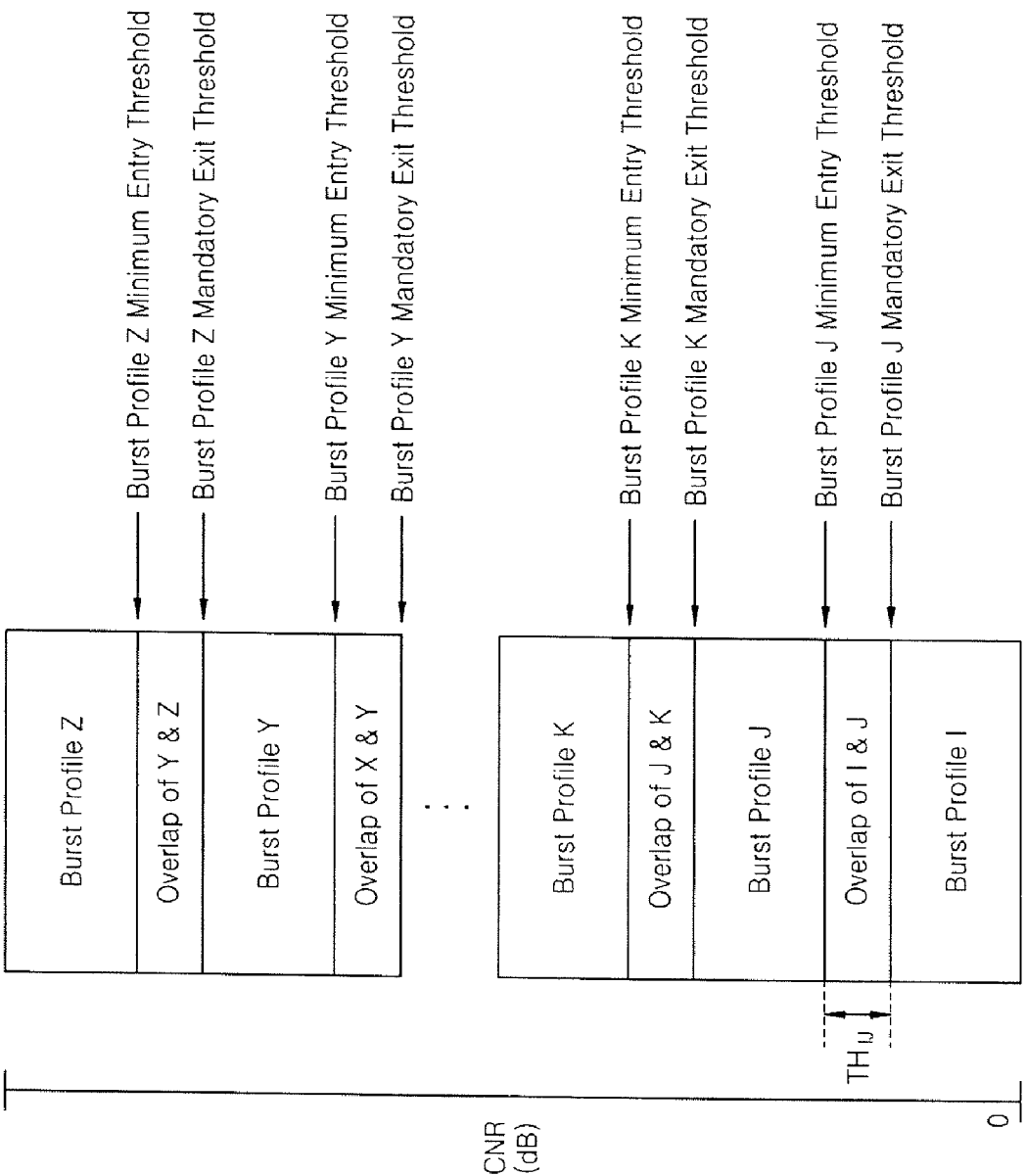
FIG. 7 illustrates burst profiles applied according to a channel status in a CMTS according to an embodiment of the present invention.

FIG. 7 illustrates burst profiles applied according to channel statuses in a CMTS according to an embodiment of the present invention. Referring to FIG. 7, channel statuses are determined as CNR values of an upstream signal, and burst profiles to be applied according to each channel status are determined. A channel status can be determined by using various factors including a BER of an upstream packet and a CNR value. In the present embodiment, a method of defining channel statuses is not described, and the CNR value is used to determine channel statuses for convenience of description.

The CMTS defines a plurality of burst profiles that are to be applied according to CNR measurement results of upstream channels. For example, according to the method of defining burst profiles based on the simulation results shown in FIG. 6, a burst profile I is applied when a CNR is measured as 0~7 dB, a burst profile J is applied when the CNR is measured as 5~12 dB, a burst profile K is applied when a CNR is measured as 10~17 dB.

A status value of adjacent burst profiles can have an overlapping area TH. Two burst profiles can be applied in an upstream channel status corresponding to the overlapping area TH. A change time from a current burst profile to a new burst profile is determined in order to prevent a frequency change between two burst profiles.

For example, burst profiles I and J can be used in an area $TH_{I,J}$ where a CNR value indicating a channel status is 5~7 dB. The currently used burst profile I can be changed to the burst profile J when a CNR value is 7 dB. Thus, 7 dB is a minimum entry threshold of the burst profile J. The currently used burst profile J can be changed to the burst profile I when a CNR value is 5 dB. Thus, 5 dB is a mandatory exit threshold of the burst profile J.

Figure 8A:
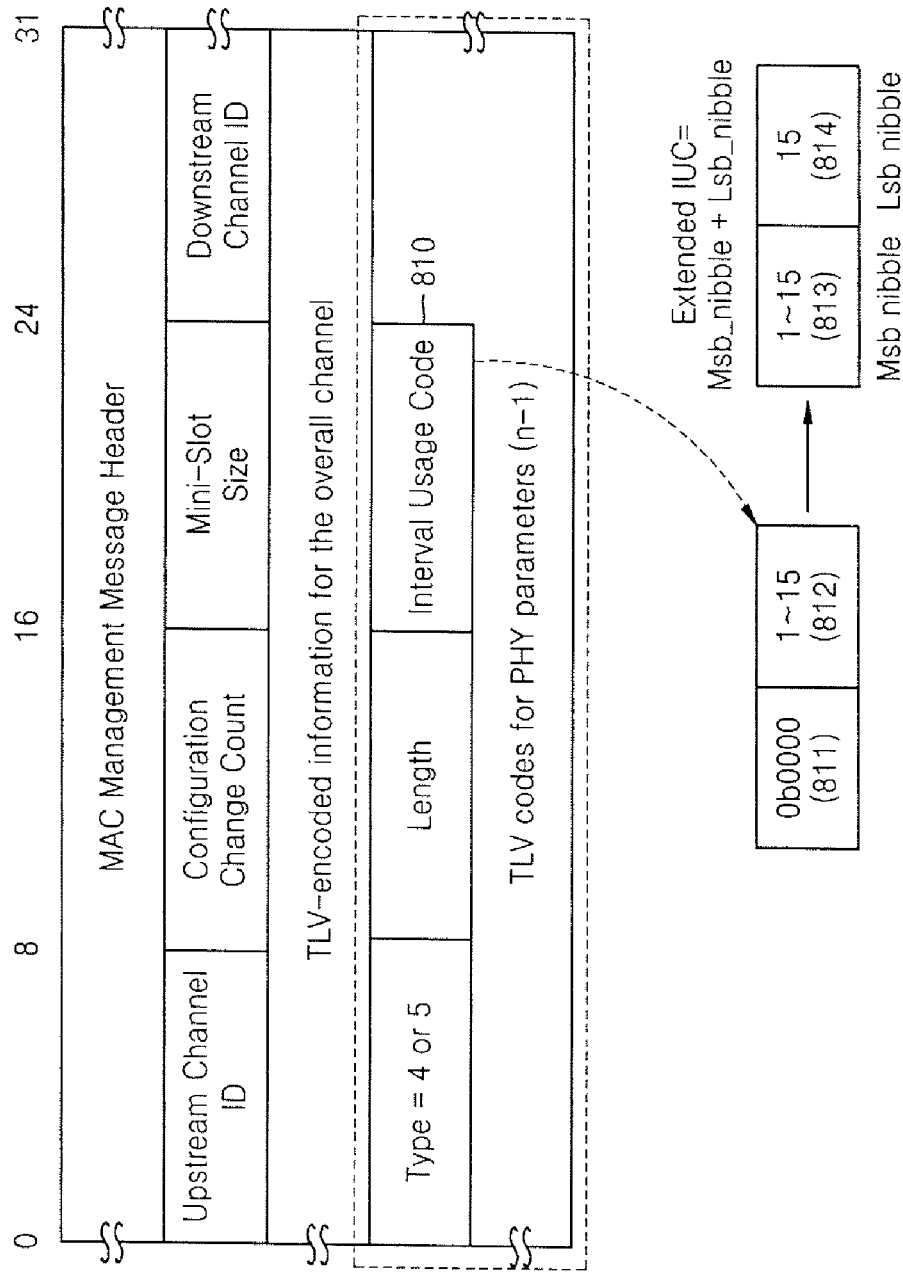
FIG. 8A illustrates a format of a UCD message for coding all burst profiles with respect to each channel status in a CMTS according to an embodiment of the present invention.

FIG. 8A illustrates a format of a UCD message for coding all burst profiles with respect to each channel status in a CMTS according to an embodiment of the present invention.

Although IUC values of 12, 13, and 14 that are not used in the DOCSIS standard can be used to add burst profiles, since the IUC values cannot indicate all burst profiles with respect to all upstream channel statuses, an 4 upper bits that are not used in IUC fields having 1 byte is used to indicate all burst profiles in the present embodiment.

Figure 4:
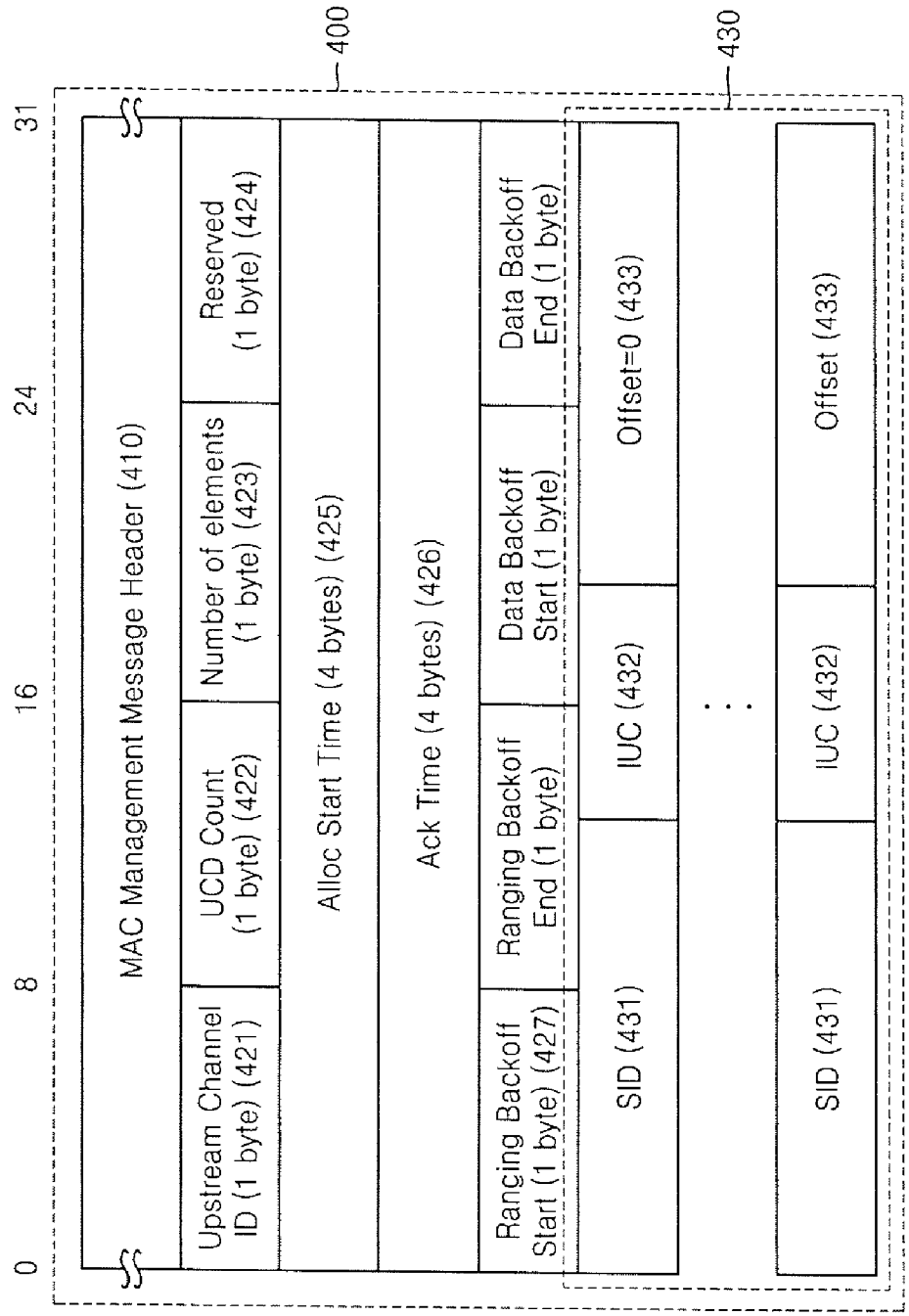
FIG. 4 illustrates a format of a mobile application part (MAP) message that a CMTS transfers to CMs.
Figure 5A:
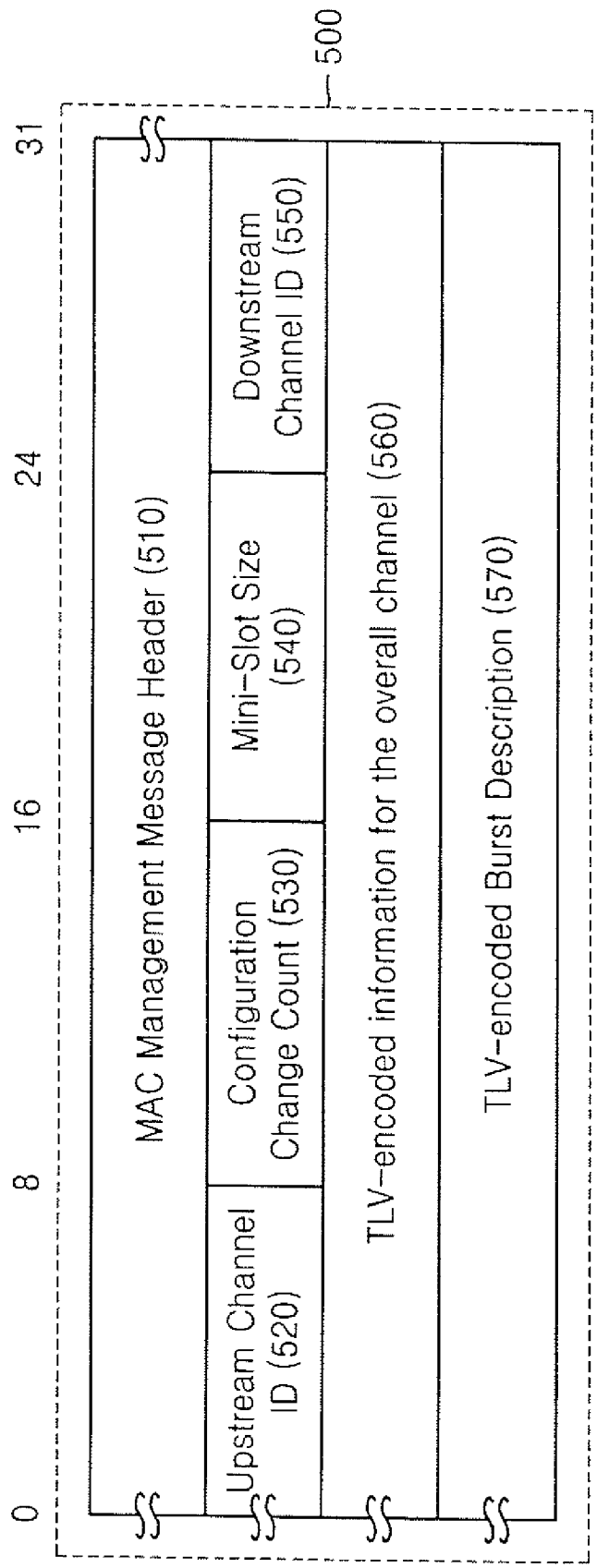
FIG. 5A illustrates a format of an upstream channel descriptor (UCD) message that a CMTS transfers to CMs.
Figure 5B:
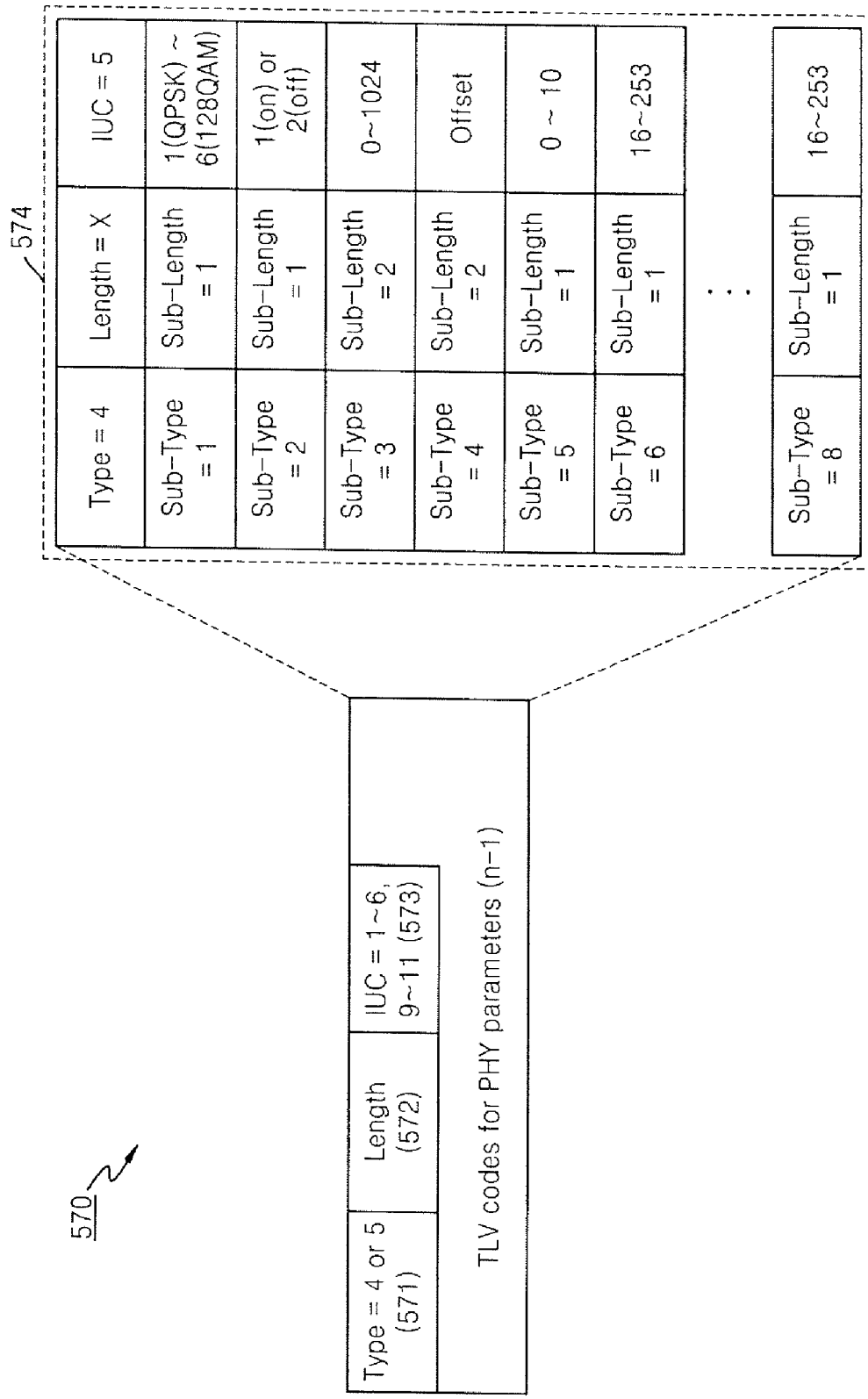
FIG. 5B illustrates a format of burst descriptor type/length/value (TLV) according to each interval usage code (IUC) value.

Referring to FIG. 8A, 4 lower bits 812 of an IUC field 810 are established as an extended IUC value of 15 814 and 4 upper bits 811 of the IUC field 810 are used to define new 15 IUC values 813 in order to include an extended IUC in a IUC message. Therefore, a combination of the 4 upper bits 811 and the 4 lower bits 812 can newly define extended IUC values that are not within the DOCSIS standard.

Burst profiles according to defined new IUC values are also defined. In particular, the DOCSIS standard must define a maximum burst size (MBS) to constitute burst profiles with regard to IUC 5 and IUC 9 defined as short burst profiles. In the present embodiment, the MBS is defined as 255. CMs that request resources by mini-slot units use an IUC 5 or IUC 9 burst profile to calculate the number of mini-slots with respect to a requested amount of resources. A CMTS that receives a message requesting resources by mini-slot units can allocate resources as burst profiles other than IUC 5 or IUC 9 according to a channel status of a corresponding CM.

In this case, the CMTS can extract an information byte from which a physical layer overhead is removed from the requested amount of resources by mini-slot units, and use burst profiles that are to be optimized according to a current channel status to calculate an amount of resources to be allocated as the mini-slot size.

Table 3 includes IUC values with regard to a total of 23 burst profiles that are to be applied according to an upstream channel status, and candidate values of representative parameters. The adjacent burst profiles described with reference to FIG. 7 are not necessarily provided with consecutive index values. Burst profile index values are information used to identify IUC values and burst profiles. However, IUC 5 and IU 9 must be established to have the MBS of 255 among IUC values (5 and 6 in the DOCSIS 1.x version, 9, 10, and 11 in the DOCSIS 2.0 version, and 5, 6, 9, 10, and 11 in the DOCSIS 3.0 version) used by given CMs, and must not be established as short R-S code values.

TABLE 3

| | IUC | | | | |
|---|---|---|---|---|---|
| Burst Profile Index | MSB Nibble 4 bits (decimal numeral) | LSB Nibble 4 bits (decimal numeral) | Modulation Type | R-S (n, k, t) | MAX. Burst Size |
|---|---|---|---|---|---|
| 1 | 0b 0000 (0) | 0b 0101 (5) | 16 QAM | R-S (220, k, t) | 255 |
| 2 | 0b 0000 (0) | 0b 0110 (6) | QPSK | R-S (220, k, t) | 0 |
| 3 | 0b 0000 (0) | 0b 1001 (9) | 64 QAM | R-S (220, k, t) | 255 |
| 4 | 0b 0000 (0) | 0b 1010 (10) | 32 QAM | R-S (220, k, t) | 0 |
| 5 | 0b 0000 (0) | 0b 1011 (11) | 8 QAM | R-S (220, k, t) | 0 |
| 6 | 0b 0000 (0) | 0b 1100 (12) | — | — | 0 |
| 7 | 0b 0000 (0) | 0b 1101 (13) | — | — | 0 |
| 8 | 0b 0000 (0) | 0b 1110 (14) | — | — | 0 |
| 9 | 0b 0001 (1) | 0b 1111 (15) | — | — | 0 |
| 10 | 0b 0010 (2) | 0b 1111 (15) | — | — | 0 |
| 11 | 0b 0011 (3) | 0b 1111 (15) | — | — | 0 |
| 12 | 0b 0100 (4) | 0b 1111 (15) | — | — | 0 |
| 13 | 0b 0101 (5) | 0b 1111 (15) | — | — | 0 |
| 14 | 0b 0110 (6) | 0b 1111 (15) | — | — | 0 |
| 15 | 0b 0111 (7) | 0b 1111 (15) | — | — | 0 |
| 16 | 0b 1000 (8) | 0b 1111 (15) | — | — | 0 |
| 17 | 0b 1001 (9) | 0b 1111 (15) | — | — | 0 |
| 18 | 0b 1010 (10) | 0b 1111 (15) | — | — | 0 |
| 19 | 0b 1011 (11) | 0b 1111 (15) | — | — | 0 |
| 20 | 0b 1100 (12) | 0b 1111 (15) | — | — | 0 |
| 21 | 0b 1101 (13) | 0b 1111 (15) | — | — | 0 |
| 22 | 0b 1110 (14) | 0b 1111 (15) | — | — | 0 |
| 23 | 0b 1111 (15) | 0b 1111 (15) | — | — | 0 |

Figure 8B:
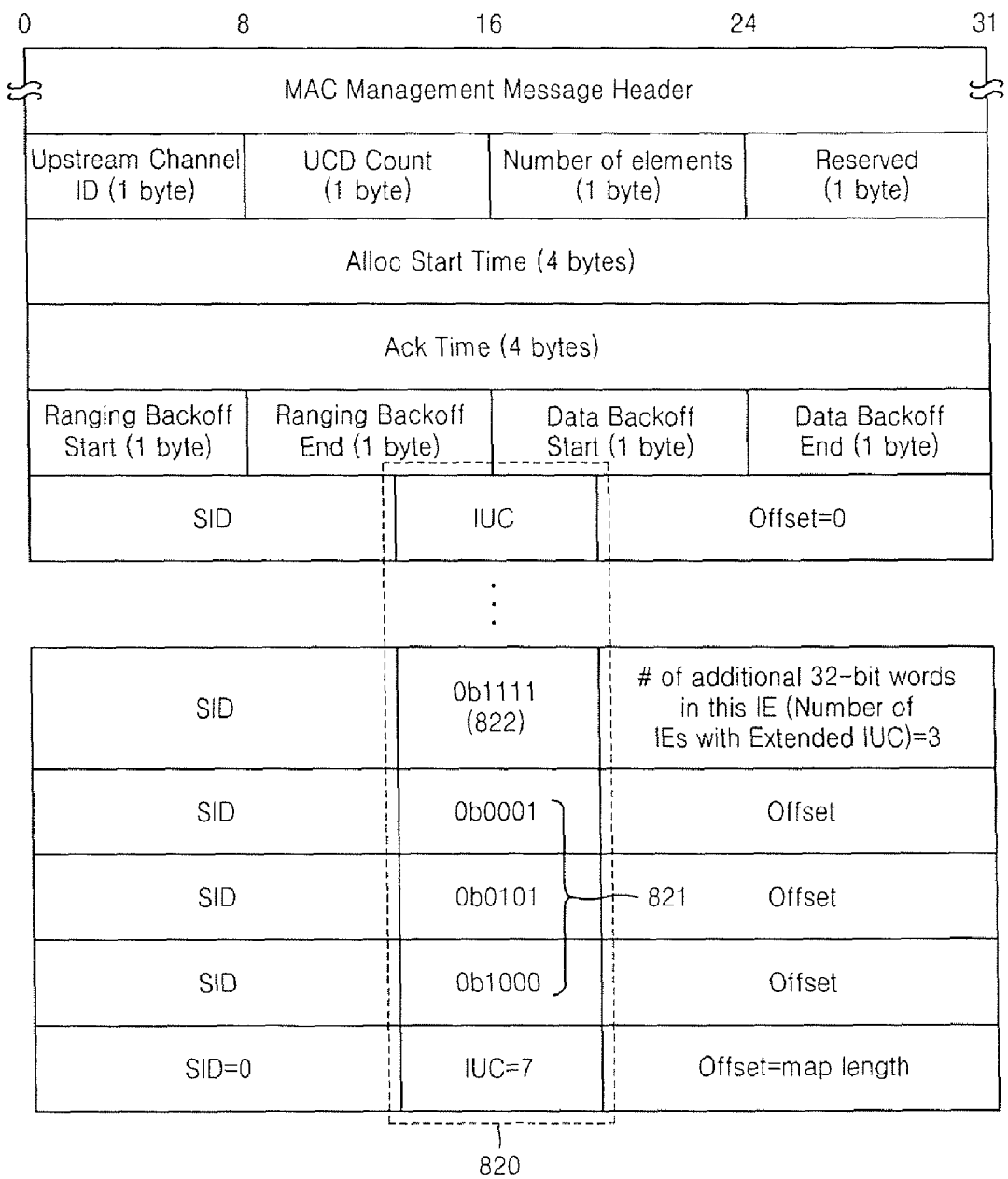
FIG. 8B is a MAP message used to allocate extended IUC values to CMs by a CMTS according to an embodiment of the present invention.

FIG. 8B is a MAP message used to allocate extended IUC values to CMs by a CMTS according to an embodiment of the present invention. Referring to FIG. 8B, in a 4 bit IUC field 820 indicating an IUC code of each IE that is bandwidth allocation information of the MAP message, a 14 bit offset filed of an IE having an extended IUC value of 15 822 indicates the number of IEs having an extended IUC value 821, and IUC values of subsequent IEs must be defined to be the same as IUC values indicated by upper 4 bits. The MAP message includes burst profiles having 16, 20, and 23 as extended IUC values.

The CMTS of the present embodiment must previously know whether to allocate resources to a specific CM by using extended IUC values. To this end, the present embodiment provides a method of informing the CMTS of whether to support an extended IUC in the specific CM. The CM transfers information on whether to support the extended IUC included in a ranging request (RNG-REQ) message, an initial ranging request (INIT-RNG-REQ) message, or a bonded upstream initial ranging request (B-INT-RNG-REQ) message that is an initial upstream message to the CMTS.

Figure 9A:
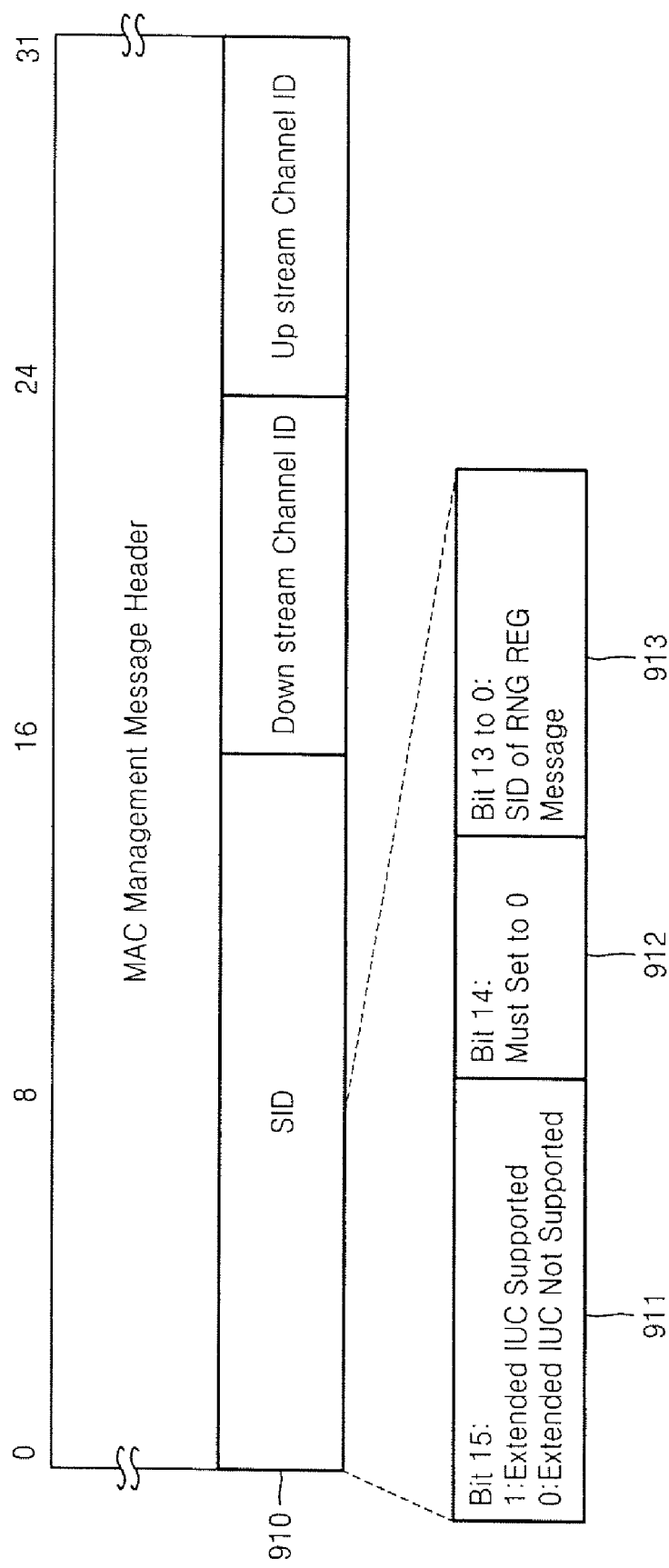
FIG. 9A illustrates a format of a ranging request (RNG-REQ) message used to inform a CMTS of whether to support an extended IUC during an initial process in a CM supporting the DOCSIS 1.x version according to an embodiment of the present invention.

FIG. 9A illustrates a format of an RNG-REQ message used to inform a CMTS of whether to support an extended IUC during an initial process in a CM supporting the DOCSIS 1.x version according to an embodiment of the present invention. Referring to FIG. 9A, the CM supporting the extended IUC uses an upper 1 bit 911 in a service ID (SID) field 910 having 16 bits next to a media access control (MAC) management message header in order to inform the CMTS of whether to support the extended IUC. In more detail, the CM supporting the extended IUC establishes the upper 1 bit 911 as 1, and a CM not supporting the extended IUC establishes the upper 1 bit 911 as 0. Furthermore, a bit 912 that does not use 1 bit is established as 0. 14 bits 913 are used to display SID information.

Figure 9B:
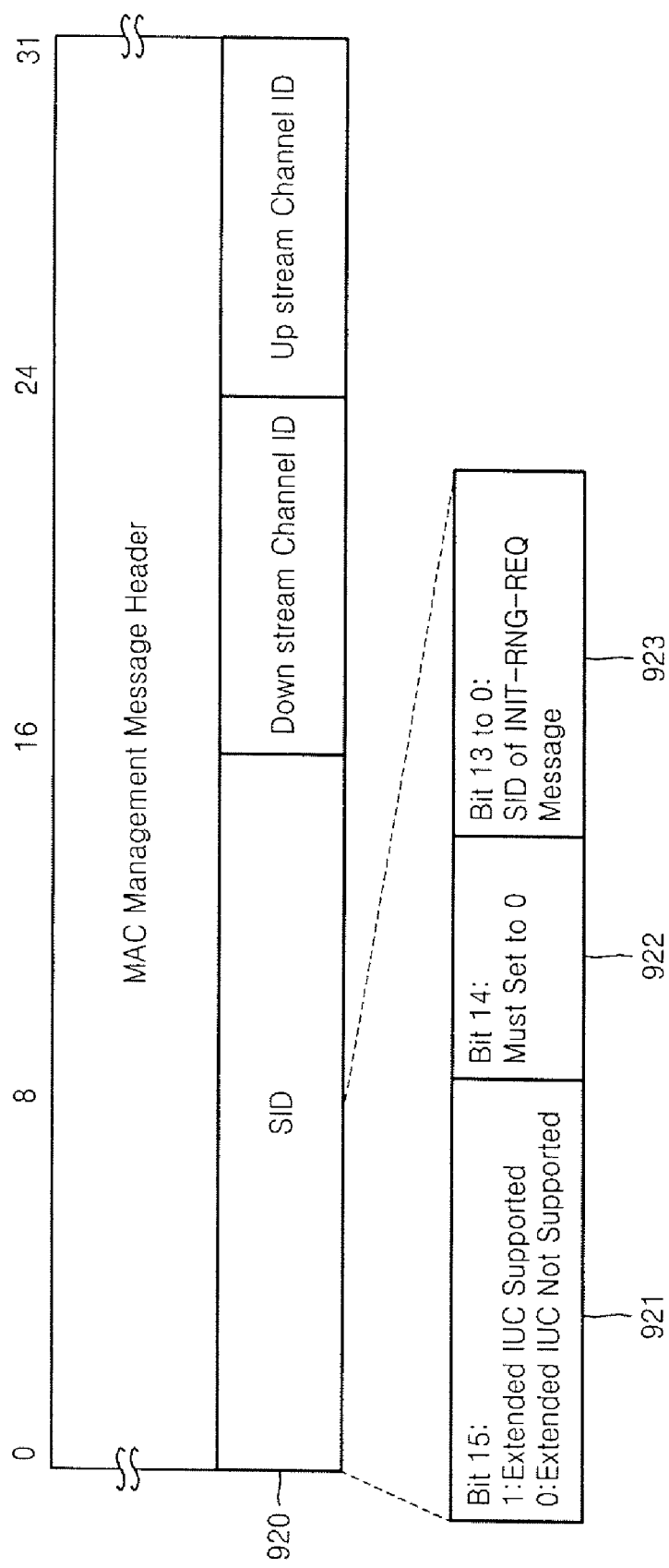
FIG. 9B illustrates a format of an initial (INIT)-RNG-REQ message used to inform a CMTS of whether to support an extended IUC during an initial process in a CM supporting the DOCSIS 2.0 version according to an embodiment of the present invention.

FIG. 9B illustrates a format of an INIT-RNG-REQ message used to inform a CMTS of whether to support an extended IUC during an initial process in a CM supporting the DOCSIS 2.0 version according to an embodiment of the present invention. Referring to FIG. 9B, the CM supporting the extended IUC uses an upper 1 bit 921 in a SID field 920 having 16 bits next to a MAC management message header in order to inform the CMTS of whether to support the extended IUC. In more detail, the CM supporting the extended IUC establishes the upper 1 bit 921 as 1, and a CM not supporting the extended IUC establishes the upper 1 bit 921 as 0. Furthermore, a bit 922 that does not use 1 bit is established as 0. 14 bits 923 are used to display SID information.

Figure 9C:
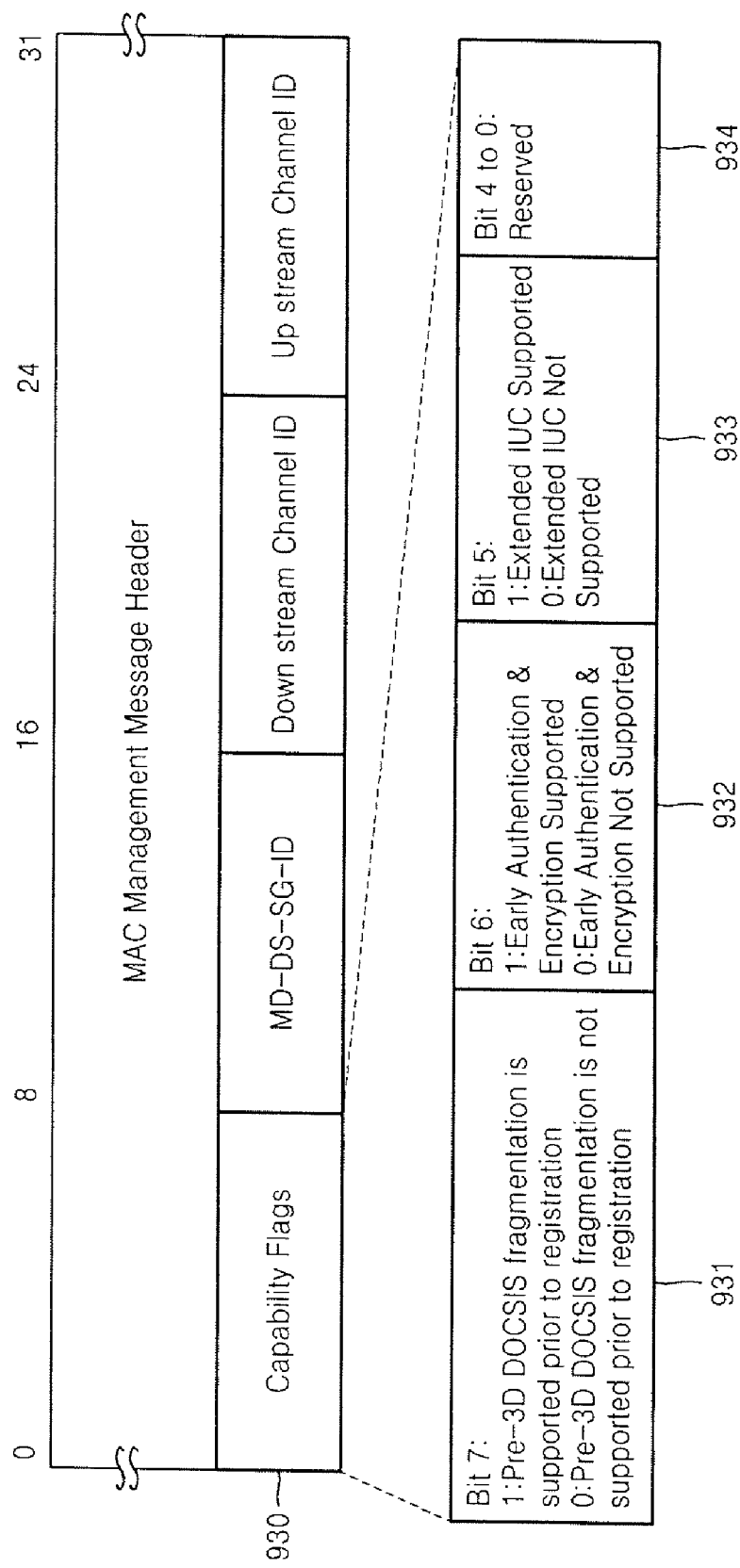
FIG. 9C illustrates a format of a bonded upstream (B)-INIT-RNG-REQ message used to inform a CMTS of whether to support an extended IUC during an initial process in a CM supporting the 3.0 version according to an embodiment of the present invention.

FIG. 9C illustrates a format of a B-INIT-RNG-REQ message used to inform a CMTS of whether to support an extended IUC during an initial process in a CM supporting the DOCSIS 3.0 version according to an embodiment of the present invention. Referring to FIG. 9C, the CM supporting the extended IUC uses a $5^{th}$ bit 933 in a capability flags field 930 having 8 bits next to a MAC management message header in order to inform the CMTS of whether to support the extended IUC. In more detail, the CM supporting the extended IUC establishes the $5^{th}$ bit 933 as 1, and a CM not supporting the extended IUC establishes the $5^{th}$ bit 933 as 0. 0~$4^{th}$ bits 934 that are not used are established as 0.

Figure 10:
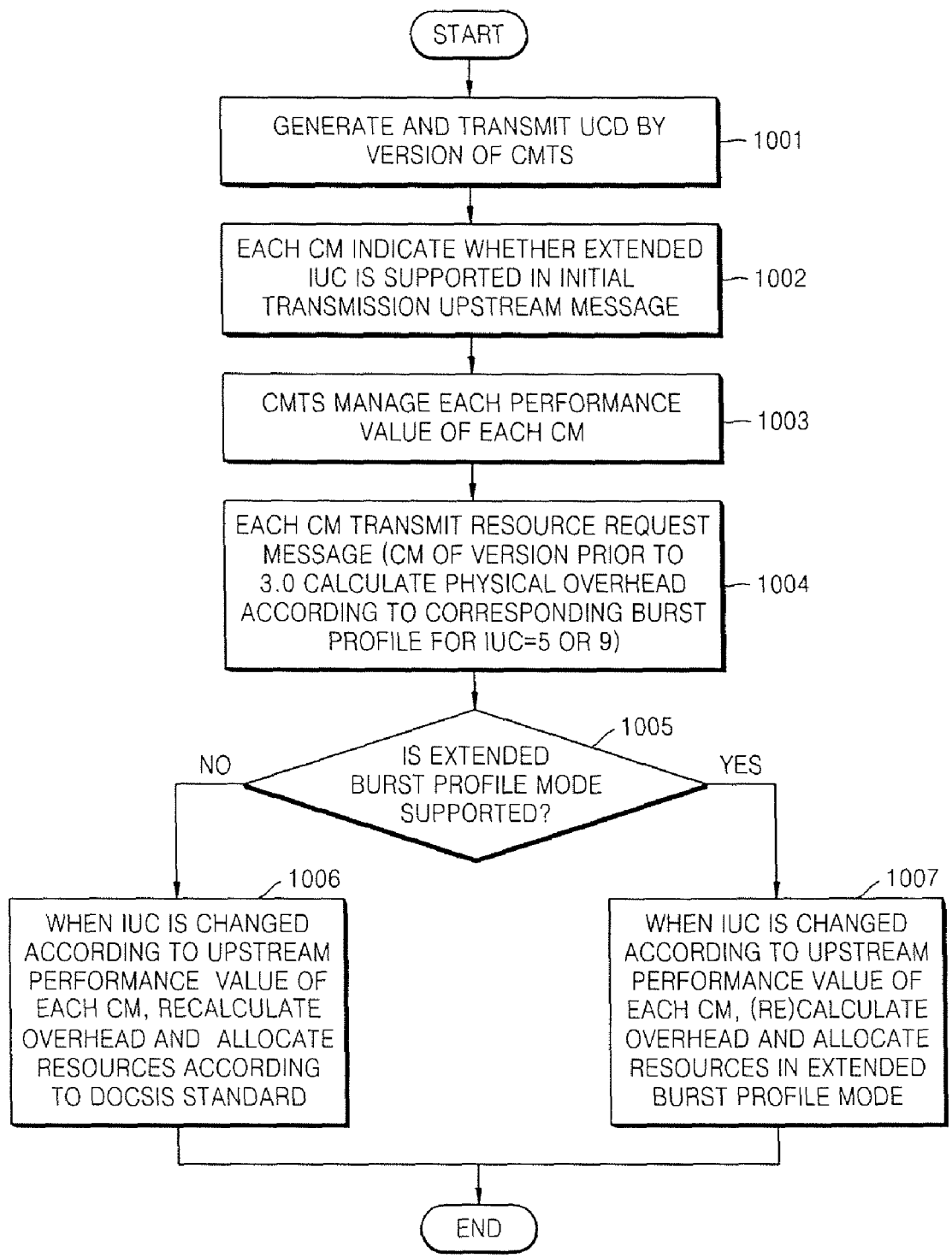
FIG. 10 is a flowchart illustrating the operations of a CMTS and CMs to allocate upstream channel resources according to an embodiment of the present invention.

FIG. 10 is a flowchart illustrating the operations of a CMTS and CMs to allocate upstream channel resources according to an embodiment of the present invention. Referring to FIG. 10, the CMTS generates a UCD message that includes burst profiles defined with regard to all upstream channel statuses and establishes an MBS in burst profile information of IUC 5 or IUC 9, as 255, and transmits the UCD message to the CM (operation 1001). The CMTS uses a more robust QAM technique of a short burst profile rather than a long burst profile. Short/long burst profiles use long forward error correction (FEC) parameters. The MBS of a short burst profile is established as 255. In this regard, the CMTS may use IUC 12/13/14 and an extended IUC.

Each CM informs the CMTS of whether to support the extended IUC via an initial upstream message, RNG-RQ/INIT-RNG-REQ/B-INIT-RNG-REQ message, and the like during an initial process (operation 1002).

The CMTS monitors and manages the upstream channel status of each CM (operation 1003).

The CMs transmit a resource request message with regard to upstream transmission data according to DOCSIS versions (operation 1004). The CMs of a DOCSIS version prior to 3.0 calculate a physical overhead according to a short burst profile corresponding to IUC 5 or IUC 9 and transmits the resource request message.

The CMTS that receives the resource request message determines whether a corresponding CM supports the extended IUC from information included in the initial upstream message (operation 1005).

The CMTS allocates one of IUC values including IUC 5/6 or 9/10/11 to a CM that does not support the extended IUC according to an upstream channel performance value and the DOCSIS version of the CM, recalculates the physical layer overhead, and allocates resources to the CM (operation 1006).

The CMTS allocates one of IUC values that can be used in the conventional version and extended IUC values including IUC 5/6/9/10/11/12/13/14/16-30 (extended IUC) to a CM that supports the extended IUC according to an upstream channel performance value and the DOCSIS version of the CM, recalculates the physical layer overhead, and allocates resources to the CM (operation 1007).

Figure 11:
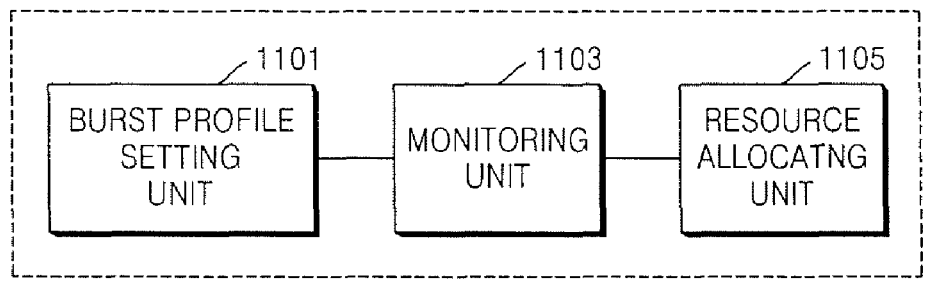
FIG. 11 is a block diagram of a CMTS according to an embodiment of the present invention.
Figure 12:
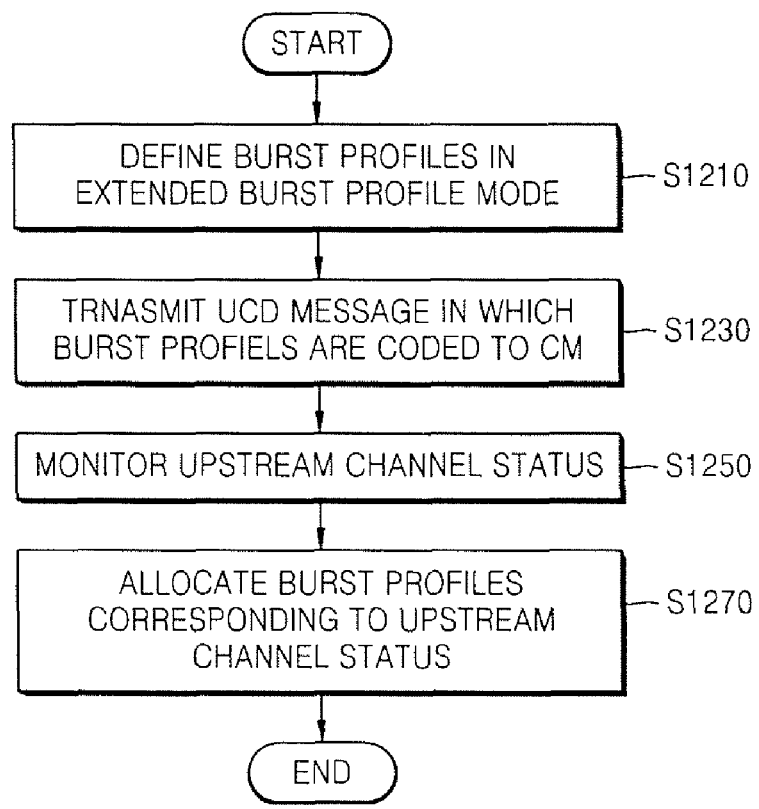
FIG. 12 is a flowchart illustrating a method of allocating resources in a CMTS according to an embodiment of the present invention.

FIG. 11 is a block diagram of a CMTS according to an embodiment of the present invention. FIG. 12 is a flowchart illustrating a method of allocating resources in a CMTS according to an embodiment of the present invention. The method of allocating resources in the CMTS will be described with reference to FIGS. 11 and 12, and any description that is the same as that given in the previous embodiment will not be repeated.

Referring to FIGS. 11 and 12, the CMTS comprises a burst profile establishing unit 1101, a monitoring unit 1103, and a resource allocating unit 1105.

The burst profile establishing unit 1101 defines a plurality of burst profiles based on an upstream channel status (operation S1210). The burst profile establishing unit 1101 defines the plurality of burst profiles by the number of burst profiles determined according to a version of each CM and the number of burst profiles added according to specific conditions based on the upstream channel status. The burst profile establishing unit 1101 defines the plurality of burst profiles based on the upstream channel status that is previously measured in an extended burst profile mode in which extended IUC values are used other rather than IUC values of the conventional DOCSIS version. Each burst profile corresponds to one of fixed IUC values in versions and extended IUC values determined due to an additional bit. The burst profile establishing unit 1101 establishes an optimized parameter value of each burst profile according to a corresponding upstream channel status. The upstream channel status may use a value obtained by using various known methods.

The burst profile establishing unit 1101 codes the defined burst profiles in an upstream channel information message (e.g. a UCD message), and transmits the UCD message to each CM (operation S1230).

The monitoring unit 1103 measures and monitors the upstream channel status of each CM (operation S1250).

The resource allocating unit 1105 allocates resources to CMs by allocating burst profiles corresponding to the upstream channel measurement result to a resource allocation message (e.g. a MAP message) (operation S1270). The resource allocating unit 1105 is informed of whether an extended burst profile mode is supported via the initial upstream message transmitted during the initial stage from CMs. The resource allocating unit 1105 receives the resource request message for requesting the allocation of resources from CMs, confirms whether the extended burst profile mode is supported, and allocates burst profiles according to a CM mode in order to allocate resources to CMs. When the upstream channel status is changed from a first upstream channel status to a second upstream channel status, the resource allocating unit 1105 changes a corresponding burst profile from the first upstream channel status to the second upstream channel status at a time when overlapping of the first upstream channel status and the second upstream channel status ends, and allocates resources to CMs.

When CMs do not support all the defined plurality of burst profiles, the CMTS defines burst profiles supported by CMs based on the upstream channel status, and uses burst profiles corresponding to the upstream channel status to allocate resources to CMs.

Figure 13:
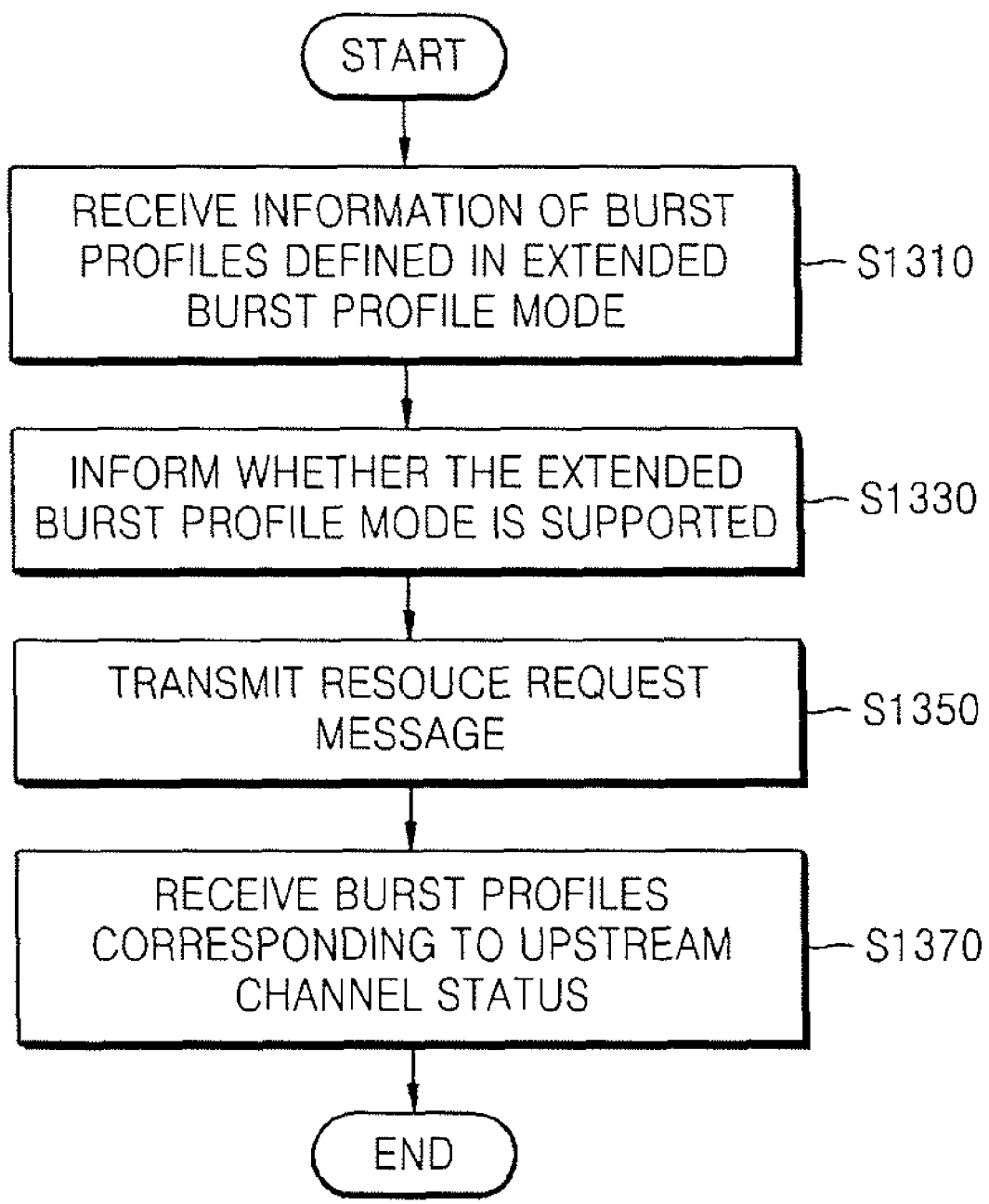
FIG. 13 is a flowchart illustrating a method of receiving resources in CMs from a CMTS according to an embodiment of the present invention.

FIG. 13 is a flowchart illustrating a method of receiving resources in CMs from a CMTS according to an embodiment of the present invention. Referring to FIG. 13, CMs receive information on a plurality of burst profiles defined in an extended burst profile mode according to an upstream channel status from the CMTS (operation S1310). The number of the received plurality of burst profiles may be the number of burst profiles determined according to a version of each CM and the number of burst profiles added according to specific conditions.

CMs informs the CMTS of whether CMs can support the extended burst profile mode via an initial upstream message during an initial stage (operation S1330).

CMs transmit a resource request message to the CMTS (operation 1350). When CMs request resources in mini-slot unit, CMs can use short burst profiles to transmit the resource request message.

CMs receive resources from the CMTS that confirms whether the CMs can support the extended burst profile mode using the defined burst profiles based on the upstream channel status of CMs (operation S1370). When CMs cannot support the extended burst profile mode, CMs receive resources by using IUC values corresponding to burst profiles that are to be allocated according to the conventional DOCSIS version. When CMs can support the extended burst profile mode, CMs receive resources by using IUC values corresponding to burst profiles that are to be allocated according to the extended burst profile mode.

When CMs support all the received plurality of burst profiles, CMs can receive resources by using burst profiles corresponding to a corresponding upstream channel status among the plurality of burst profiles. When CMs do not support all the received plurality of burst profiles, CMs can receive resources by using burst profiles corresponding to a corresponding upstream channel status among burst profiles supported by CMs defined based on the upstream channel status.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

Also, functional programs, code and code segments for accomplishing the present invention can be easily construed by programmer of ordinary skill in the art to which the present invention pertains.

The present invention does not divide burst profiles used to transmit upstream data according to a data length but instead, constitutes a plurality of burst profiles optimized according to an upstream channel measurement result by using extended IUC values, so that resources are allocated to each CM that uses the same upstream channel by using optimized burst profiles according to the upstream channel measurement result, thereby increasing transmission efficiency of the upstream channel.

Furthermore, the present invention can allocate resources to CMs of the conventional versions that do not support the extended IUC by using burst profiles based on an upstream channel status.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of allocating upstream channel resources by using a cable modem termination system (CMTS) in a hybrid fiber coaxial (HFC) network, the method comprising:
    defining a plurality of burst profiles based on an upstream channel status, the plurality of burst profiles being defined based on a previously measured upstream channel status that is previously measured in an extended burst profile mode,
    wherein each of the plurality of burst profiles define physical layer parameters for transmitting packets, and wherein the plurality of burst profiles include burst profiles of fixed IUC values in industry standard versions and burst profiles of additional extended IUC values, wherein the burst profiles of the additional extended IUC values are used in the extended burst profile mode;
    transmitting the defined plurality of burst profiles to each of a plurality of cable modems (CMs);
    receiving, from each of the CMs, an upstream message including information of whether the extended burst profile mode, in which a CM uses the additional extended IUC values, is supported by the CM;
    monitoring the upstream channel status of each CM; and
    allocating resources to each of the CMs by using burst profiles corresponding to the upstream channel status from among the plurality of burst profiles and the information of whether the CM supports the extended burst profile mode,
    wherein allocating a burst profile to each of the CMs comprises:
    transmitting a MAP message used to allocate the burst profiles to CMs, the MAP message comprising a plurality of information elements (IEs) each having an IUC field comprising one of a plurality of IUC codes corresponding respectively to the plurality of burst profiles,
    wherein the IUC codes include a predetermined IUC value for indicating that extended IUC values follow, and when the IUC field includes the predetermined IUC value, an offset field corresponding to the IUC field indicates the number of IEs having an extended IUC value and the IUC values of subsequent IEs are determined as extended IUC values.

2. The method of claim 1, wherein the defining of the plurality of burst profiles comprises: defining the plurality of burst profiles by the number of burst profiles determined according to a version of each CM and the number of burst profiles added according to specific conditions.

3. The method of claim 2, wherein each of the plurality of burst profiles corresponds to one of interval usage code (IUC) values fixed in industry standard versions and extended IUC values determined in additional bits not allocated for IUC values fixed in industry standard versions.

4. The method of claim 1, wherein the plurality of burst profiles are transmitted to each CM via an upstream channel information message.

5. The method of claim 1, wherein the defining of the plurality of burst profiles comprises: establishing an optimized parameter value to the corresponding upstream channel status of each of the plurality of burst profiles.

6. The method of claim 1, wherein the defining of the plurality of burst profiles comprises: establishing, by the CMTS, a maximum burst size (MBS) in short burst profiles among the plurality of burst profiles so that each CM requesting resources in mini-slot units can calculate the number of mini-slots with regard to an amount of requested resources and calculate a physical layer overhead by using short burst profiles, and
    when CMs request resources in mini-slot units, the allocating a burst profile comprises: receiving by the CMTS from the CM a requested amount of resources which includes physical layer overhead calculated using short burst profiles,
    extracting, by the CMTS, an information byte from which a physical layer overhead is removed from the requested amount of resources by mini-slot units,
    using burst profiles that are optimized according to a current channel status to calculate an amount of resources to be allocated as the mini-slot size, and recalculating the physical layer overhead according to the optimized burst profiles used for the respective CMs.

7. The method of claim 1, further comprising: when each CM does not support all the defined plurality of burst profiles, defining burst profiles supported by each CM based on the upstream channel status, and allocating resources to each CM by using burst profiles corresponding to the upstream channel status.

8. The method of claim 7, wherein whether each CM supports burst profiles is determined from information included in one of a ranging request (RNG-REQ) message, an initial ranging request (INIT-RNG-REQ), or a bonded upstream initial ranging request (B-INT-RNG-REQ) transmitted by each CM during an initial stage.

9. The method of claim 1 wherein the upstream channel statuses upon which the respective plurality of burst profiles are based overlap, the method further comprising: when the upstream channel status is changed from a first upstream channel status to a second upstream channel status, changing from a current burst profile of a CM corresponding to the first upstream channel status to a new burst profile corresponding to the second upstream channel status at a time when overlapping of the first upstream channel status and the second upstream channel status ends, and allocating resources to each CM.

10. A method of receiving upstream channel resources in a CM in a HFC network, the method comprising:
    receiving a plurality of burst profiles defined based on an upstream channel status from a CMTS, wherein each of the plurality of burst profiles define physical layer parameters for transmitting packets, and wherein the plurality of profiles include burst profiles of fixed IUC values in industry standard versions and burst profiles of additional extended IUC values used in an extended burst profile mode;

informing the CMTS of whether the CM supports all the plurality of burst profiles by transmitting, to the CMTS, an upstream message including information of whether the extended burst profile mode, in which a CM uses the additional extended IUC values, is supported by the CM;

transmitting a resource request message to the CMTS; and receiving resources from the CMTS by using the plurality of burst profiles determined according to whether the CM supports all the plurality of burst profiles and defined based on the upstream channel status, wherein when the CM supports all the received plurality of burst profiles, receiving resources by using burst profiles corresponding to the upstream channel status among the plurality of burst profiles; and when the CM does not support the additional extended IUC values, receiving resources by using burst profiles corresponding to the upstream status among burst profiles corresponding to the fixed IUC values supported by the CM defined based on the upstream channel status, wherein the burst profile assigned to the CM not supporting the additional extended IUC values is assigned according to an upstream channel performance value and a version of the CM, wherein receiving resources comprises:

receiving a MAP message used to allocate the burst profiles to CMs, the MAP message comprising a plurality of information elements (IEs) each having an IUC field comprising one of a plurality of IUC codes corresponding respectively to the plurality of burst profiles, wherein the IUC codes include a predetermined IUC value for indicating that extended IUC values follow, and when the IUC field includes the predetermined IUC value, an offset field corresponding to the IUC field indicates the number of IEs having an extended IUC value and the IUC values of subsequent IEs are determined as extended IUC values.

11. The method of claim 10, wherein the number of the received plurality of burst profiles is the number of burst profiles determined according to a version of the CM and the number of burst profiles added according to specific conditions.

12. The method of claim 10, wherein the transmitting of the resource request message comprises: transmitting the resource request message by using short burst profiles when the CM requests resources in mini-slot units.

13. The method of claim 10, wherein the informing of the CMTS of whether the CM supports all the plurality of burst profiles occurs via an initial upstream message during an initial stage.

14. An apparatus for allocating upstream channel resources in a HFC network, the apparatus comprising:

a burst profile establishing unit defining a plurality of burst profiles based on an upstream channel status such that each of the plurality of burst profiles define physical layer parameters for transmitting packets and the plurality of burst profiles include burst profiles of fixed IUC values in industry standard versions and burst profiles of additional extended IUC values used in an extended burst profile mode, transmitting the defined plurality of burst profiles to each of a plurality of CMs, and receiving an upstream message including information of whether the extended burst profile mode, in which a CM uses the additional extended IUC values, is supported from each of the CMs, wherein the plurality of burst profiles are defined based on a previously measured upstream channel status that is previously measured in an extended burst profile mode;

a monitoring unit monitoring the upstream channel status of each CM; and a resource allocating unit allocating resources to each of the CMs by using burst profiles corresponding to the upstream channel status from among the plurality of burst profiles and the information of whether the CM supports the extended burst profile mode, wherein the resource allocating unit allocates a burst profile to each of the CMs by transmitting a MAP message used to allocate the burst profiles to CMs, the MAP message comprising a plurality of information elements (IEs) each having an IUC field comprising one of a plurality of IUC codes corresponding respectively to the plurality of burst profiles, wherein the IUC codes include a predetermined IUC value for indicating that extended IUC values follow, and when the IUC field includes the predetermined IUC value, an offset field corresponding to the IUC field indicates the number of IEs having an extended IUC value and the IUC values of subsequent IEs are determined as extended IUC values.

15. The apparatus of claim 14, wherein the burst profile establishing unit defines the plurality of burst profiles by the number of burst profiles determined according to a version of each CM and the number of burst profiles added according to specific conditions.

16. The apparatus of claim 15, wherein each of the plurality of burst profiles corresponds to one of IUC values fixed in industry standard versions and extended IUC values determined in additional bits not allocated for IUC values fixed in industry standard versions.

17. The apparatus of claim 14, wherein the burst profile establishing unit establishes an optimized parameter value to the corresponding upstream channel status of each of the plurality of burst profiles.

18. The apparatus of claim 14, wherein the burst profile establishing unit establishes an MBS in short burst profiles from among the plurality of burst profiles so that each CM requesting resources by mini-slot units can calculate the number of mini-slots with regard to an amount of requested resources and calculate physical layer overhead by using short burst profiles, and when CMs request resources in mini-slot units, the resource allocating unit extracting an information byte from which a physical layer overhead is removed from the requested amount of resources by mini-slot units, using burst profiles that are optimized according to a current channel status to calculate an amount of resources to be allocated as the mini-slot size, and recalculating the physical layer overhead according to the optimized burst profiles used for the respective CMs.

19. The apparatus of claim 14, wherein the resource allocating unit, when each CM does not support all the defined plurality of burst profiles, defines burst profiles supported by each CM based on the upstream channel status, and allocates resources to each CM by using burst profiles corresponding to the upstream channel status.

20. The apparatus of claim 19, wherein whether each CM supports burst profiles is determined from information included in an initial upstream message transmitted by each CM during an initial stage.

21. The apparatus of claim 14 wherein the upstream channel statuses upon which the respective burst profiles are based overlap, and wherein the resource allocating unit, when the upstream channel status is changed from a first upstream channel status to a second upstream channel status, changes from a current burst profile of a CM corresponding to the first upstream channel status to a new burst profile corresponding to the second upstream channel status at a time when overlapping of the first upstream channel status and the second upstream channel status ends, and allocates resources to each CM.

22. A method of allocating upstream channel resources by using a cable modem termination system (CMTS) in a hybrid fiber coaxial (HFC) network, the method comprising:
  defining a plurality of burst profiles based on an upstream channel status, the plurality of burst profiles being defined based on a previously measured upstream channel status that is previously measured in an extended burst profile mode;
  transmitting the defined plurality of burst profiles to each of a plurality of cable modems (CMs);
  receiving an upstream message including information of whether an extended burst profile mode is supported from each of the CMs;
  monitoring the upstream channel status of each CM; and
  allocating resources to each of the CMs by using burst profiles corresponding to the upstream channel status from among the plurality of burst profiles and the information of whether the CM supports the extended burst profile mode,
  wherein allocating a burst profile to each of the CMs comprises:
  transmitting a MAP message used to allocate the burst profiles to CMs, the MAP message comprising a plurality of information elements (IEs) each having an IUC field comprising one of a plurality of IUC codes corresponding respectively to the plurality of burst profiles,
  wherein the IUC codes include a predetermined IUC value for indicating that extended IUC values follow, and when the IUC field includes the predetermined IUC value, an offset field corresponding to the IUC field indicates the number of IEs having an extended IUC value and the IUC values of subsequent IEs are determined as extended IUC values.

* * * * *